US012047965B1

(12) United States Patent
Talakoub et al.

(10) Patent No.: US 12,047,965 B1
(45) Date of Patent: Jul. 23, 2024

(54) COMMUNICATION SCHEDULER

(71) Applicant: Apple Inc., Cupertino, CA (US)

(72) Inventors: Shahram Talakoub, San Jose, CA (US); Sebastian B. Seeber, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 162 days.

(21) Appl. No.: 17/483,669

(22) Filed: Sep. 23, 2021

Related U.S. Application Data

(60) Provisional application No. 63/223,826, filed on Jul. 20, 2021.

(51) Int. Cl.
| | |
|---|---|
| *H04W 72/23* | (2023.01) |
| *H04W 4/90* | (2018.01) |
| *H04W 72/1273* | (2023.01) |
| *H04W 72/566* | (2023.01) |
| *H04W 88/16* | (2009.01) |
| H04W 84/06 | (2009.01) |

(52) U.S. Cl.
CPC ............ *H04W 72/23* (2023.01); *H04W 4/90* (2018.02); *H04W 72/1273* (2013.01); *H04W 72/566* (2023.01); *H04W 88/16* (2013.01); H04W 84/06 (2013.01)

(58) Field of Classification Search
CPC ............. H04W 72/23; H04W 72/1273; H04W 72/566; H04W 88/16; H04W 84/06; H04W 4/90
See application file for complete search history.

(56) References Cited

U.S. PATENT DOCUMENTS

| | | | |
|---|---|---|---|
| 6,628,921 | B1 | 9/2003 | Vaddiparty et al. |
| 7,149,533 | B2 | 12/2006 | Laird et al. |
| 7,466,986 | B2 | 12/2008 | Halcrow et al. |
| 7,532,898 | B2 | 5/2009 | Halcrow et al. |

(Continued)

FOREIGN PATENT DOCUMENTS

| | | | | |
|---|---|---|---|---|
| CA | 2373467 C | * | 7/2006 | ......... H04B 7/18584 |
| EP | 1266526 B1 | * | 4/2012 | ......... H04L 12/2801 |

OTHER PUBLICATIONS

U.S. Appl. No. 16/945,133, filed Jul. 31, 2020.

*Primary Examiner* — Ricardo H Castaneyra
(74) *Attorney, Agent, or Firm* — Treyz Law Group, P.C.; Michael H. Lyons

(57) ABSTRACT

A communications system may include user equipment (UE) devices, communications satellites, gateways, and a terrestrial network. The UE devices may receive broadcast signals from the constellation. The UE devices may transmit registration requests to the gateways via the satellites in response to the broadcast signals. The registration requests may include information identifying the geographic locations of the UE devices and may include two-line element (TLE) identifiers. A scheduler on the terrestrial network may receive forward link traffic requests for the UE devices, each with a corresponding priority. The scheduler may also receive satellite information that includes thermal constraints, position information, and power information associated with the satellites. The scheduler may generate forward link traffic grants for the UE devices based on the forward link traffic requests, the thermal constraints, the TLE versions, the geographic locations, and the priorities.

20 Claims, 9 Drawing Sheets

(56) References Cited

U.S. PATENT DOCUMENTS

| | | |
|---|---|---|
| 8,103,445 B2 | 1/2012 | Smith et al. |
| 8,665,847 B2 | 3/2014 | Holostov et al. |
| 8,930,458 B2 | 1/2015 | Lewis |
| 10,181,896 B1 | 1/2019 | Swift et al. |
| 2005/0111630 A1 | 5/2005 | Potorny et al. |
| 2009/0005061 A1 | 1/2009 | Ward et al. |
| 2010/0091699 A1* | 4/2010 | Wu ................. H04W 28/20 370/316 |
| 2014/0099884 A1 | 4/2014 | Lozano et al. |
| 2019/0289616 A1* | 9/2019 | Hampel ............. H04B 7/0413 |
| 2019/0297506 A1 | 9/2019 | Shoshan et al. |
| 2019/0342147 A1 | 11/2019 | O'Reirdan et al. |
| 2020/0329395 A1* | 10/2020 | Pezeshki ............ H04B 7/088 |

* cited by examiner

COMMUNICATION SCHEDULER

This application claims the benefit of U.S. Provisional Patent Application No. 63/223,826, filed Jul. 20, 2021, which is hereby incorporated by reference herein in its entirety.

FIELD

This relates generally to wireless communications, including wireless communications by user equipment via one or more satellites.

BACKGROUND

Communications systems are used to convey data between user equipment devices. Some communications systems include satellites that wirelessly convey data between user equipment devices and gateways. Each satellite provides wireless network access to the user equipment devices located within a corresponding coverage area on Earth.

The user equipment transmits reverse link data to the gateways via the satellites. Conversely, the gateways transmit forward link data to the user equipment via the satellites. In practice, it can be difficult to provide forward link data to multiple user equipment devices distributed across one or more geographic locations in an efficient manner.

SUMMARY

A communications system may include user equipment (UE) devices, a constellation of communications satellites, gateways, and a terrestrial network. The gateways may transmit forward link data to the UE devices via the constellation. The UE devices may transmit reverse link data to the gateways via the constellation. A satellite communications cloud region may be implemented on the terrestrial network. The satellite communications cloud region may include a scheduler for scheduling forward link transmissions.

The UE devices may receive broadcast signals from the constellation. The UE devices may transmit registration requests to the gateways via the constellation in response to the broadcast signals. The registration requests may include information identifying the geographic locations of the UE devices and may include two-line element (TLE) identifiers that identify versions of TLEs stored on the UE devices. The scheduler may receive forward link traffic requests for the UE devices, each with a corresponding priority. The scheduler may also receive satellite information that includes thermal constraints, position information, and power information associated with the constellation. The scheduler may generate forward link traffic grants for the UE devices based on the forward link traffic requests, the thermal constraints, the TLE versions, the geographic locations, and the priorities.

For example, the scheduler may identify satellites having coverage areas that overlap the geographic locations. The scheduler may assign resources from the satellites that account for the thermal constraints and power information (e.g., by avoiding scheduling for communications satellites that are excessively hot, by reducing data rates to accommodate power constraints, etc.). The scheduler may order the forward link traffic grants on a priority basis and then on a first-come-first-serve basis within each priority. If desired, the scheduler may group forward link traffic grants for the same signal beam of the same satellite together as contiguous data bursts. In this way, the scheduler may perform forward link scheduling in a fair manner based on the geographic locations, the TLE versions, and constraints on the communications satellites.

DETAILED DESCRIPTION

Figure 1:
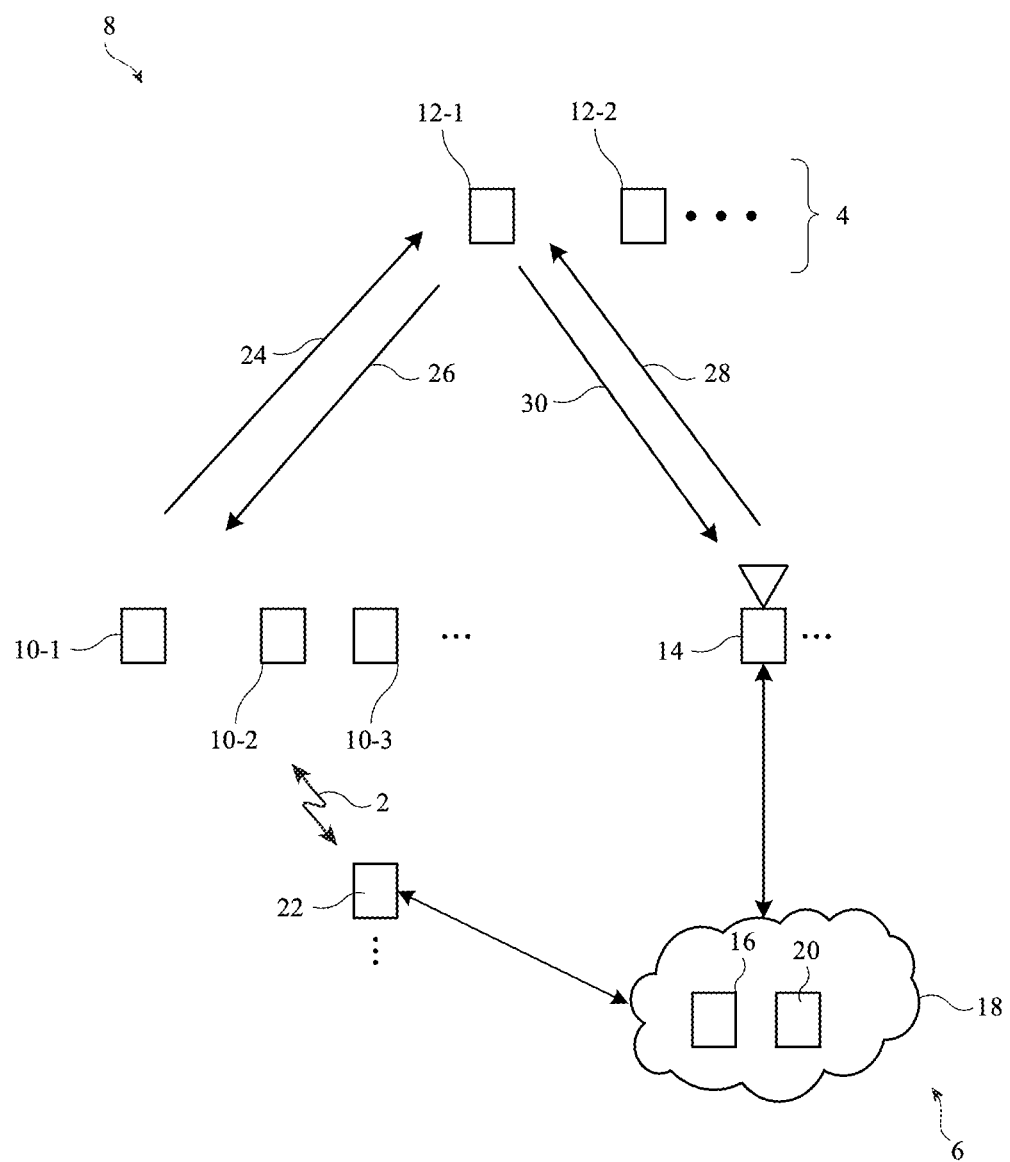
FIG. 1 is a diagram of an illustrative communications system having user equipment devices that communicate with gateways via a constellation of communications satellites in accordance with some embodiments.

FIG. 1 is a diagram of an illustrative communications system 8. Communications system 8 (sometimes referred to herein as communications network 8, network 8, satellite communications system 8, or satellite communications network 8) may include a ground-based (terrestrial) gateway system that includes one or more gateways 14, one or more user equipment (UE) devices 10 (e.g., a first UE device 10-1, a second UE device 10-2, a third UE device 10-3, etc.), and a terrestrial network 6 on Earth. Terrestrial network 6 may include terrestrial-based wireless communications equipment 22 and network portion 18. Wireless communications equipment 22 may include one or more wireless base stations (e.g., for implementing a cellular telephone network) and/or access points. Communications system 8 may also include a constellation 4 of one or more communication satellites 12 (e.g., a first communications satellite 12-1, a second communications satellite 12-2, etc.). Constellation 4 may sometimes be referred to herein as satellite constellation 4. Communications satellites 12 are located in space (e.g., in orbit above Earth). While communications system 8 may include any desired number of gateways 14, only a single gateway 14 is illustrated in FIG. 1 for the sake of clarity. Each gateway 14 in communications system 8 may be located at a different respective geographic location on Earth (e.g., across different regions, states, provinces, countries, continents, etc.).

Network portion 18 may be communicably coupled to wireless communications equipment 22 and each of the gateways 14 in communications system 8. Gateway 14 may include a satellite network ground station and may therefore sometimes also be referred to as ground station 14 or satellite network ground station 14. Each gateway 14 may include one or more antennas (e.g., electronically and/or mechanically adjustable antennas), modems, transceivers, amplifiers, beam forming circuitry, control circuitry, etc. The components of each gateway 14 may, for example, be disposed at a respective geographic location (e.g., within the same computer, server, data center, building, etc.). Gateways 14 may convey communications data between terrestrial network 6 and UE devices 10 via satellite constellation 4.

Network portion 18 may include any desired number of network nodes, terminals, and/or end hosts that are communicably coupled together using communications paths that include wired and/or wireless links. The wired links may include cables (e.g., ethernet cables, optical fibers or other optical cables that convey signals using light, telephone cables, etc.). Network portion 18 may include one or more relay networks, mesh networks, local area networks (LANs), wireless local area networks (WLANs), ring networks (e.g., optical rings), cloud networks, virtual/logical networks, the Internet, combinations of these, and/or any other desired network nodes coupled together using any desired network topologies (e.g., on Earth). The network nodes, terminals, and/or end hosts may include network switches, network routers, optical add-drop multiplexers, other multiplexers, repeaters, modems, servers, network cards, wireless access points, wireless base stations, UE devices such as UE devices 10, and/or any other desired network components. The network nodes in network portion 18 may include physical components such as electronic devices, servers, computers, user equipment, etc., and/or may include virtual components that are logically defined in software and that are distributed across (over) two or more underlying physical devices (e.g., in a cloud network configuration).

Network portion 18 may include one or more satellite network operations centers such as network operations center (NOC) 16. NOC 16 may control the operation of gateways 14 in communicating with satellite constellation 4. NOC 16 may also control the operation of the satellites 12 in satellite constellation 4. For example, NOC 16 may convey control commands via gateways 14 that control positioning operations (e.g., orbit adjustments), sensing operations (e.g., thermal information gathered using one or more thermal sensors), and/or any other desired operations performed in space by satellites 12. NOC 16, gateways 14, and satellite constellation 4 may be operated or managed by a corresponding satellite constellation operator.

Communications system 8 may also include a satellite communications (satcom) network service provider (e.g., a satcom network carrier or operator) for controlling wireless communications between UE devices 10 and terrestrial network 6 via satellite constellation 4. The satcom network service provider may be a different entity than the satellite constellation operator that controls/operates NOC 16, gateways 14, and satellite constellation 4 or, if desired, may be the same entity as the satellite constellation operator. Wireless communications equipment 22 in terrestrial network 6 may be operated by a terrestrial network carrier or service provider. The terrestrial network carrier or service provider may be a different entity than the satcom network service provider or, if desired, may be the same entity as the satcom network service provider.

Gateway 14 may control the operations of satellite constellation 4 over corresponding radio-frequency communications links. Satellite constellation 4 may include any desired number of satellites (e.g., two satellites, four satellites, ten satellites, dozens of satellites, hundreds of satellites, thousands of satellites, etc.), two of which are shown in FIG. 1. If desired, two or more of the satellites 12 in satellite constellation 4 may convey radio-frequency signals between each other using satellite-to-satellite (e.g., relay) links.

Satellites 12 may include low earth orbit (LEO) satellites at orbital altitudes of less than around 8,000 km (e.g., satellites in low earth orbits, inclined low earth orbits, low earth circular orbits, etc.), geosynchronous satellites at orbital altitudes of greater than around 30,000 km (e.g., satellite in geosynchronous orbits), medium earth orbit (MEO) satellites at orbital altitudes between around 8,000 km and 30,000 km (e.g., satellite in medium earth orbits), sun synchronous satellites (e.g., satellites in sun synchronous orbits), satellites in tundra orbits, satellites in Molniya orbits, satellites in polar orbits, and/or satellites in any other desired orbits around Earth. Communications system 8 may include satellites in any desired combination of orbits or orbit types.

Each satellite 12 may communicate with one or more UE devices 10 on Earth using one or more radio-frequency communications links (e.g., satellite-to-user equipment links). Satellites 12 may also communicate with gateways 14 on Earth using radio-frequency communications links (e.g., satellite-to-gateway links). Radio-frequency signals may be conveyed between UE devices 10 and satellites 12 and between satellites 12 and gateways 14 in IEEE bands such as the IEEE C band (4-8 GHz), S band (2-4 GHz), L band (1-2 GHz), X band (8-12 GHz), W band (75-110 GHz), V band (40-75 GHz), K band (18-27 GHz), $K_a$ band (26.5-40 GHz), $K_u$ band (12-18 GHz), and/or any other desired satellite communications bands. If desired, different bands may be used for the satellite-to-user equipment links than for the satellite-to-gateway links.

Communications may be performed between gateways 14 and UE devices 10 in a forward (FWD) link direction and/or in a reverse link direction. In the forward link direction (sometimes referred to simply as the forward link), wireless data is conveyed from gateways 14 to UE device(s) 10 via satellite constellation 4. For example, a gateway 14 may transmit forward link data to one of the satellites in satellite constellation 4 such as satellite 12-1 (e.g., using radio-frequency signals 28). Satellite 12-1 may transmit (e.g., relay) the forward link data received from gateway 14 to UE device(s) 10 (e.g., using radio-frequency signals 26). Radio-frequency signals 28 are conveyed in an uplink direction from gateway 14 to satellite 12-1 and may therefore sometimes be referred to herein as uplink (UL) signals 28, forward link UL signals 28, or forward link signals 28. Radio-frequency signals 26 are conveyed in a downlink direction from satellite 12-1 to UE device(s) 10 and may therefore sometimes be referred to herein as downlink (DL) signals 26, forward link DL signals 26, or forward link signals 26.

In the reverse link direction (sometimes referred to simply as the reverse link), wireless data is conveyed from UE device(s) 10 to gateways 14 via satellite constellation 4. For example, one of the UE devices 10 such as UE device 10-1 may transmit reverse link data to satellite 12-1 using radio-frequency signals 24 and satellite 12-1 may transmit (e.g., relay) the reverse link data received from UE device 10-1 to a corresponding gateway 14 using radio-frequency signals 30. Radio-frequency signals 24 are conveyed in an uplink direction from UE device 10-1 to satellite 12-1 and may therefore sometimes be referred to herein as uplink (UL) signals 24, reverse link UL signals 24, or reverse link signals 24. Radio-frequency signals 30 are conveyed in a downlink direction from satellite 12-1 to gateway 14 and may therefore sometimes be referred to herein as downlink (DL) signals 30, reverse link DL signals 30, or reverse link signals 30. Gateway 14 may forward wireless data between UE device(s) 10 and network portion 18. Network portion 18 may forward the wireless data to any desired network nodes or terminals.

If desired, UE devices 10 may also convey radio-frequency signals with terrestrial-based wireless communications equipment 22 over terrestrial network wireless communication links 2 when available. Wireless communications equipment 22 may include wireless base stations and/or access points. UE devices 10 may sometimes be referred to herein as being "online" or "on-grid" when the UE devices are within range of wireless communications equipment 22 and when wireless communications equipment 22 provides access (e.g., communications resources) to network portion 18 for the UE devices. When the UE devices are online, the UE devices may communicate with other network nodes or terminals in network portion 18 via terrestrial network wireless communications links 2. Conversely, UE devices 10 may sometimes be referred to herein as being "offline" or "off-grid" when the UE devices are out of range of wireless communications equipment 22 or when wireless communications equipment 22 does not provide access to network portion 18 for the UE devices (e.g., when wireless communications equipment 22 is disabled due to a power outage, natural disaster, traffic surge, or emergency, when wireless communications equipment 22 denies access to network portion 18 for the UE devices, when wireless communications equipment 22 is overloaded with traffic, etc.). If desired, UE devices 10 may include separate antennas for handling communications over the satellite-to-user equipment link and one or more terrestrial network wireless communication links 2 or UE devices 10 may include a single antenna that handles both the satellite-to-user equipment link and the terrestrial network wireless communications links. The terrestrial network wireless communications links may be, for example, cellular telephone links (e.g., links maintained using a cellular telephone communications protocol such as a 4G Long Term Evolution (LTE) protocol, a 3G protocol, a 3GPP Fifth Generation (5G) New Radio (NR) protocol, etc.), wireless local area network links (e.g., Wi-Fi® and/or Bluetooth links), etc.

The wireless data conveyed in DL signals 26 may sometimes be referred to herein as DL data, forward link DL data, or forward link data. UL signals 28 may also convey the forward link data (e.g., forward link data that is routed by satellite 12-1 to UE device(s) 10 in DL signals 26). The wireless data conveyed in UL signals 24 may sometimes be referred to herein as UL data, reverse link UL data, or reverse link data. DL signals 30 may also convey the reverse link data. The forward link data may be generated by any desired network nodes or terminals of terrestrial network 6.

The forward link data and the reverse link data may include text data such as email messages, text messages, web browser data, an emergency or SOS message, a location message identifying the location of UE device(s) 10, or other text-based data, audio data such as voice data (e.g., for a bi-directional satellite voice call) or other audio data (e.g., streaming satellite radio data), video data (e.g., for a bi-directional satellite video call or to stream video data transmitted by gateway 14 at UE device(s) 10), cloud network synchronization data, data generated or used by software applications running on UE device(s) 10, and/or any other desired data. UE devices 10 may only receive forward link data, may only transmit reverse link data, or may both transmit reverse link data and receive forward link data. Each satellite 12 may communicate with the UE devices 10 located within its coverage area (e.g., UE devices 10 located within cells on Earth that overlap the signal beam(s) producible by the satellite). The UE and ground station scheduler may determine when to switch satellites for communications (e.g., thereby using the same TLE version so that the transition is synchronous between the UE and scheduler).

The satcom network service provider for communications system 8 may operate, control, and/or manage a satcom control network such as satcom network region 20 in network portion 18. Satcom network region 20 may be implemented on one or more network nodes and/or terminals of network portion 18. In one implementation that is described herein as an example, satcom network region 20 may be formed from a cloud computing network distributed over multiple underlying physical network nodes and/or terminals distributed across one or more geographic regions. Satcom network region 20 may therefore sometimes be referred to herein as satcom cloud region 20, satcom cloud network 20, or satcom cloud network region 20.

Satcom cloud region 20 may control and coordinate wireless communications between terminals of terrestrial network 6 and UE devices 10 via satellite constellation 4. For example, gateways 14 may receive reverse link data from UE devices 10 via satellite constellation 4 and may route the reverse link data to satcom cloud region 20. Satcom cloud region 20 may perform any desired processing operations on the reverse link data. For example, satcom cloud region 20 may identify destinations for the reverse link data and may forward the reverse link data to the identified destinations. Satcom cloud region 20 may also receive forward link data for transmission to UE devices 10 from one or more terminals of terrestrial network 6. Satcom cloud region 20 may process the forward link data to schedule the forward link data for transmission to UE devices 10 via satellite constellation 4. Satcom cloud region 20 may schedule the forward link data for transmission to UE devices 10 by generating forward link traffic grants for each of the UE devices that are to receive forward link data. Satcom cloud region 20 may provide the forward link data and the forward link traffic grants to gateways 14. Gateways 14 may transmit the forward link data to UE devices 10 via satellite constellation 4 according to the forward link traffic grants (e.g., according to a forward link communications schedule that implements the forward link traffic grants).

UE device 10 may be a computing device such as a laptop computer, a desktop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, a wireless internet-connected voice-controlled speaker, a home entertainment device, a remote control device, a gaming controller, a peripheral user input device, a wireless base station or access point, equipment that implements the functionality of two or more of these devices, or other electronic equipment.

Figure 2:
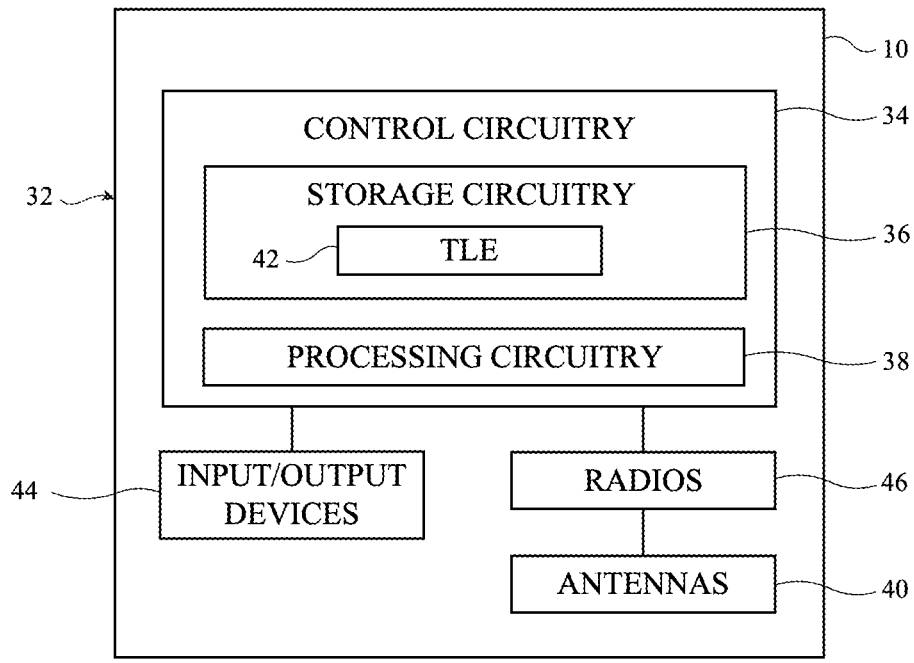
FIG. 2 is a schematic diagram of an illustrative user equipment device in accordance with some embodiments.

As shown in FIG. 2, UE device 10 may include components located on or within an electronic device housing such as housing 32. Housing 32, which may sometimes be referred to as a case, may be formed of plastic, glass, ceramics, fiber composites, metal (e.g., stainless steel, aluminum, metal alloys, etc.), other suitable materials, or a combination of these materials. In some situations, parts or all of housing 32 may be formed from dielectric or other low-conductivity material (e.g., glass, ceramic, plastic, sapphire, etc.). In other situations, housing 32 or at least some of the structures that make up housing 32 may be formed from metal elements.

UE device 10 may include control circuitry 34. Control circuitry 34 may include storage such as storage circuitry 36. Storage circuitry 36 may include hard disk drive storage, nonvolatile memory (e.g., flash memory or other electrically-programmable-read-only memory configured to form a solid-state drive), volatile memory (e.g., static or dynamic random-access-memory), etc. Storage circuitry 36 may include storage that is integrated within UE device 10 and/or removable storage media.

Control circuitry 34 may include processing circuitry such as processing circuitry 38. Processing circuitry 38 may be used to control the operation of UE device 10. Processing circuitry 38 may include on one or more processors, microprocessors, microcontrollers, digital signal processors, host processors, baseband processor integrated circuits, application specific integrated circuits, central processing units (CPUs), graphics processing units (GPUs), etc. Control circuitry 34 may be configured to perform operations in device 10 using hardware (e.g., dedicated hardware or circuitry), firmware, and/or software. Software code for performing operations on UE device 10 may be stored on storage circuitry 36 (e.g., storage circuitry 36 may include non-transitory (tangible) computer readable storage media that stores the software code). The software code may sometimes be referred to as program instructions, software, data, instructions, or code. Software code stored on storage circuitry 36 may be executed by processing circuitry 38.

Control circuitry 34 may be used to run software on UE device 10 such as satellite navigation applications, internet browsing applications, voice-over-internet-protocol (VOIP) telephone call applications, email applications, media playback applications, operating system functions, etc. To support interactions with external equipment, control circuitry 34 may be used in implementing communications protocols. Communications protocols that may be implemented using control circuitry 34 include internet protocols, wireless local area network (WLAN) protocols (e.g., IEEE 802.11 protocols—sometimes referred to as Wi-Fi®), protocols for other short-range wireless communications links such as the Bluetooth® protocol or other wireless personal area network (WPAN) protocols, IEEE 802.11ad protocols (e.g., ultra-wideband protocols), cellular telephone protocols (e.g., 3G protocols, 4G (LTE) protocols, 5G protocols, etc.), antenna diversity protocols, satellite navigation system protocols (e.g., global positioning system (GPS) protocols, global navigation satellite system (GLONASS) protocols, etc.), antenna-based spatial ranging protocols (e.g., radio detection and ranging (RADAR) protocols or other desired range detection protocols for signals conveyed at millimeter and centimeter wave frequencies), satellite communications protocols, or any other desired communications protocols. Each communications protocol may be associated with a corresponding radio access technology (RAT) that specifies the physical connection methodology used in implementing the protocol.

UE device 10 may store satellite information associated with one or more of the satellites 12 in satellite constellation 4 on storage circuitry 36. The satellite information may include a satellite almanac identifying the position (e.g., orbit information, elevation information, altitude information, inclination information, eccentricity information, orbital period information, trajectory information, right ascension information, declination information, ground track information, etc.) and/or the velocity of satellites 12 (e.g., relative to the surface of Earth). This information may include a two-line element (TLE) such as TLE 42. TLE 42 may identify (include) information about the orbital motion of one or more of the satellites 12 in satellite constellation 4 (e.g., satellite epoch, first and/or second derivatives of motion, drag terms, etc.). TLE 42 may, for example, be used by control circuitry 34 as an input for calculating, predicting, or identifying the location of satellites 12 at a given point in time. TLE 42 may be in the format of a text file having two lines or columns that include the set of elements forming the TLE, for example.

The TLE describing the satellites 12 in satellite constellation 4 may change over time (e.g., as the operating characteristics of satellite constellation 4 change over time, are refined to characterize the orbits of satellites 12 at different points in the future more accurately, etc.). UE device 10 may receive (e.g., download) a current (updated) version of TLE 42 from wireless communications equipment 22 when the UE device is online and whenever a current (updated) version of the TLE is available. NOC 16 may, for example, generate an updated TLE associated with satellite constellation 4 and may forward the updated TLE to UE device 10 via external communications equipment 22 when UE device 10 is online. TLE 42 may be too large to be transmitted via satellite constellation 4 itself without consuming excessive resources on satellite constellation 4 (e.g., while UE device 10 is offline). UE device 10 may also store information identifying the current version of the TLE 42 stored on storage circuitry 36 (e.g., a TLE version number or identifier). NOC 16 may maintain a list of all versions of the TLEs associated with satellite constellation 4. UE device 10-1 may use TLE 42 in generating uplink signals 24 when the UE device has reverse link data for transmission.

UE device 10 may include input-output devices 44. Input-output devices 44 may be used to allow data to be supplied to UE device 10 and to allow data to be provided from UE device 10 to external devices. Input-output devices 44 may include user interface devices, data port devices, and other input-output components. For example, input-output devices 44 may include touch sensors, displays (e.g., touch-sensitive and/or force-sensitive displays), light-emitting components such as displays without touch sensor capabilities, buttons (mechanical, capacitive, optical, etc.), scrolling wheels, touch pads, key pads, keyboards, microphones, cameras, buttons, speakers, status indicators, audio jacks and other audio port components, digital data port devices, motion sensors (accelerometers, gyroscopes, and/or compasses that detect motion), capacitance sensors, proximity sensors, magnetic sensors, force sensors (e.g., force sensors coupled to a display to detect pressure applied to the display), temperature sensors, etc. In some configurations, keyboards, headphones, displays, pointing devices such as trackpads, mice, and joysticks, and other input-output devices may be coupled to UE device 10 using wired or wireless connections (e.g., some of input-output devices 44 may be peripherals that are coupled to a main processing unit or other portion of UE device 10 via a wired or wireless link).

UE device 10 may also include wireless circuitry to support wireless communications. The wireless circuitry may include one or more antennas 40 and one or more radios 46. Each radio 46 may include circuitry that operates on signals at baseband frequencies (e.g., baseband processor circuitry), signal generator circuitry, modulation/demodulation circuitry (e.g., one or more modems), radio-frequency transceiver circuitry (e.g., radio-frequency transmitter circuitry, radio-frequency receiver circuitry, mixer circuitry for downconverting radio-frequency signals to baseband frequencies or intermediate frequencies between radio and baseband frequencies and/or for upconverting signals at baseband or intermediate frequencies to radio-frequencies, etc.), amplifier circuitry (e.g., one or more power amplifiers and/or one or more low-noise amplifiers (LNAs)), analog-to-digital converter (ADC) circuitry, digital-to-analog converter (DAC) circuitry, control paths, power supply paths, signal paths (e.g., radio-frequency transmission lines, intermediate frequency transmission lines, baseband signal lines, etc.), switching circuitry, filter circuitry, and/or any other circuitry for transmitting and/or receiving radio-frequency signals using antenna(s) 40. The components of each radio 46 may be mounted onto a respective substrate or integrated into a respective integrated circuit, chip, package, or system-on-chip (SOC). If desired, the components of multiple radios 46 may share a single substrate, integrated circuit, chip, package, or SOC.

Antenna(s) 40 may be formed using any desired antenna structures. For example, antenna(s) 40 may include antennas with resonating elements that are formed from loop antenna structures, patch antenna structures, inverted-F antenna structures, slot antenna structures, planar inverted-F antenna structures, helical antenna structures, monopole antennas, dipoles, hybrids of these designs, etc. If desired, one or more antennas 40 may include antenna resonating elements formed from conductive portions of housing 32 (e.g., peripheral conductive housing structures extending around a periphery of a display on UE device 10). Filter circuitry, switching circuitry, impedance matching circuitry, and/or other antenna tuning components may be adjusted to adjust the frequency response and wireless performance of antenna(s) 40 over time. If desired, multiple antennas 40 may be implemented as a phased array antenna (e.g., where each antenna forms a radiator or antenna element of the phased array antenna, which is sometimes also referred to as a phased antenna array). In these scenarios, the phased array antenna may convey radio-frequency signals within a signal beam. The phases and/or magnitudes of each radiator in the phased array antenna may be adjusted so the radio-frequency signals for each radiator constructively and destructively interfere to steer or orient the signal beam in a particular pointing direction (e.g., a direction of peak signal gain). The signal beam may be adjusted or steered over time.

Transceiver circuitry in radios 46 may convey radio-frequency signals using one or more antennas 40 (e.g., antenna(s) 40 may convey the radio-frequency signals for the transceiver circuitry). The term "convey radio-frequency signals" as used herein means the transmission and/or reception of the radio-frequency signals (e.g., for performing unidirectional and/or bidirectional wireless communications with external wireless communications equipment). Antenna(s) 40 may transmit the radio-frequency signals by radiating the radio-frequency signals into free space (or to free space through intervening device structures such as a dielectric cover layer). Antenna(s) 40 may additionally or alternatively receive the radio-frequency signals from free space (e.g., through intervening devices structures such as a dielectric cover layer). The transmission and reception of radio-frequency signals by antenna(s) 40 each involve the excitation or resonance of antenna currents on an antenna resonating element in the antenna by the radio-frequency signals within the frequency band(s) of operation of the antenna.

Each radio 46 may be coupled to one or more antennas 40 over one or more radio-frequency transmission lines. The radio-frequency transmission lines may include coaxial cables, microstrip transmission lines, stripline transmission lines, edge-coupled microstrip transmission lines, edge-coupled stripline transmission lines, transmission lines formed from combinations of transmission lines of these types, etc. The radio-frequency transmission lines may be integrated into rigid and/or flexible printed circuit boards if desired. One or more of the radio-frequency lines may be shared between radios 46 if desired. Radio-frequency front end (RFFE) modules may be interposed on one or more of the radio-frequency transmission lines. The radio-frequency front end modules may include substrates, integrated circuits, chips, or packages that are separate from radios 46 and may include filter circuitry, switching circuitry, amplifier circuitry, impedance matching circuitry, radio-frequency coupler circuitry, and/or any other desired radio-frequency circuitry for operating on the radio-frequency signals conveyed over the radio-frequency transmission lines.

Radios 46 may use antenna(s) 40 to transmit and/or receive radio-frequency signals within different frequency bands at radio frequencies (sometimes referred to herein as communications bands or simply as a "bands"). The frequency bands handled by radios 46 may include satellite communications bands (e.g., the C band, S band, L band, X band, W band, V band, K band, $K_a$ band, $K_u$ band, etc.), wireless local area network (WLAN) frequency bands (e.g., Wi-Fi® (IEEE 802.11) or other WLAN communications bands) such as a 2.4 GHz WLAN band (e.g., from 2400 to 2480 MHz), a 5 GHz WLAN band (e.g., from 5180 to 5825 MHz), a Wi-Fi® 6E band (e.g., from 5925-7125 MHz), and/or other Wi-Fi® bands (e.g., from 1875-5160 MHz), wireless personal area network (WPAN) frequency bands such as the 2.4 GHz Bluetooth® band or other WPAN communications bands, cellular telephone frequency bands (e.g., bands from about 600 MHz to about 5 GHz, 3G bands, 4G LTE bands, 5G New Radio Frequency Range 1 (FR1) bands below 10 GHz, 5G New Radio Frequency Range 2 (FR2) bands between 20 and 60 GHz, etc.), other centimeter or millimeter wave frequency bands between 10-300 GHz, near-field communications (NFC) frequency bands (e.g., at 13.56 MHz), satellite navigation frequency bands (e.g., a GPS band from 1565 to 1610 MHz, a Global Navigation Satellite System (GLONASS) band, a BeiDou Navigation Satellite System (BDS) band, etc.), ultra-wideband (UWB) frequency bands that operate under the IEEE 802.15.4 protocol and/or other ultra-wideband communications protocols, communications bands under the family of 3GPP wireless communications standards, communications bands under the IEEE 802.XX family of standards, and/or any other desired frequency bands of interest.

While control circuitry 34 is shown separately from radios 46 in the example of FIG. 2 for the sake of clarity, radios 46 may include processing circuitry that forms a part of processing circuitry 38 and/or storage circuitry that forms a part of storage circuitry 36 of control circuitry 34 (e.g., portions of control circuitry 34 may be implemented on radios 46). As an example, control circuitry 34 may include baseband circuitry or other control components that form a part of radios 46. The baseband circuitry may, for example, access a communication protocol stack on control circuitry 34 (e.g., storage circuitry 36) to: perform user plane functions at a PHY layer, MAC layer, RLC layer, PDCP layer, SDAP layer, and/or PDU layer, and/or to perform control plane functions at the PHY layer, MAC layer, RLC layer, PDCP layer, RRC, layer, and/or non-access stratum layer.

Figure 3:
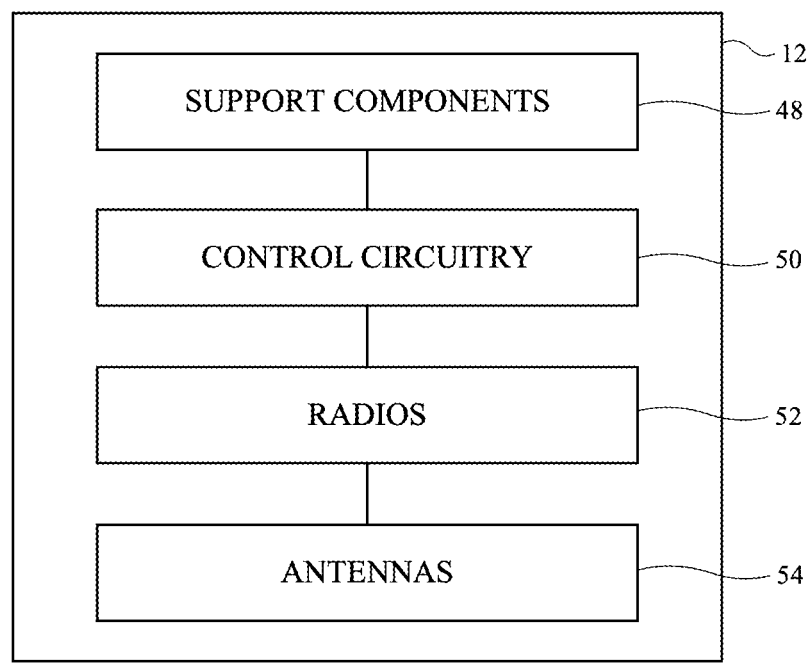
FIG. 3 is a schematic diagram of an illustrative communications satellite in accordance with some embodiments.

FIG. 3 is a diagram of an illustrative satellite 12 in communications system 8. As shown in FIG. 3, satellite 12 may include satellite support components 48. Support components 48 may include batteries, solar panels, sensors (e.g., accelerometers, gyroscopes, temperature sensors, light sensors, etc.), guidance systems, propulsion systems, and/or any other desired components associated with supporting satellite 12 in orbit above Earth.

Satellite 12 may include control circuitry 50. Control circuitry 50 may be used in controlling the operations of satellite 12. Control circuitry 50 may include processing circuitry such as processing circuitry 38 of FIG. 2 and may include storage circuitry such as storage circuitry 36 of FIG. 2. Control circuitry 50 may also control support components 48 to adjust the trajectory or position of satellite 12 in space.

Satellite 12 may include antennas 54 and one or more radios 52. Radios 52 may use antennas 54 to transmit DL signals 26 and DL signals 30 and to receive UL signals 24 and UL signals 28 of FIG. 1 (e.g., in one or more satellite communications bands). Radios 52 may include transceivers, modems, integrated circuit chips, application specific integrated circuits, filters, switches, up-converter circuitry, down-converter circuitry, analog-to-digital converter circuitry, digital-to-analog converter circuitry, amplifier circuitry (e.g., multiport amplifiers), beam steering circuitry, etc.

Antennas 54 may include any desired antenna structures (e.g., patch antenna structures, dipole antenna structures, monopole antenna structures, waveguide antenna structures, Yagi antenna structures, inverted-F antenna structures, cavity-backed antenna structures, combinations of these, etc.). In one suitable arrangement, antennas 52 may include one or more phased array antennas. Each phased array antenna may include beam forming circuitry having a phase and magnitude controller coupled to each antenna element in the phased array antenna. The phase and magnitude controllers may provide a desired phase and magnitude to the radio-frequency signals conveyed over the corresponding antenna element. The phases and magnitudes of each antenna element may be adjusted so that the radio-frequency signals conveyed by each of the antenna elements constructively and destructively interfere to produce a radio-frequency signal beam (e.g., a spot beam) in a desired pointing direction (e.g., an angular direction towards Earth at which the radio-frequency signal beam exhibits peak gain). Radio-frequency lenses may also be used to help guide the radio-frequency signal beam in a desired pointing direction. Each radio-frequency signal beam also exhibits a corresponding beam width. This allows each radio-frequency signal beam to cover a corresponding cell on Earth (e.g., a region on Earth overlapping the radio-frequency signal beam such that the radio-frequency signal beam exhibits a power greater than a minimum threshold value within that region/cell). Satellite 12 may convey radio-frequency signals over multiple concurrently-active signal beams if desired. If desired, satellite 12 may offload some or all of its beam forming operations to gateway 14.

If desired, radios 52 and antennas 54 may support communications using multiple polarizations. For example, radios 52 and antennas 54 may transmit and receive radio-frequency signals with a first polarization (e.g., a left-hand circular polarization (LHCP)) and may transmit and receive radio-frequency signals with a second polarization (e.g., a right-hand circular polarization (RHCP)). Antennas 54 may be able to produce a set of different signal beams at different beam pointing angles (e.g., where each beam overlaps a respective cell on Earth). The set of signal beams may include a first subset of signal beams that convey LHCP signals (e.g., LHCP signal beams) and a second subset of signal beams that convey RHCP signals (e.g., RHCP signal beams). The LHCP and RHCP signal beams may, for example, be produced using respective multiport power amplifiers (MPAs) on satellite 12. Each MPA may include a number of solid state power amplifiers (SSPAs) (e.g., each MPA may include one SSPA for each signal beam producible using that MPA). This may allow LHCP and RHCP signal beams to be active simultaneously. For example, if radios 52 and antennas 54 can produce 16 different signal beams, the 16 signal beams may include a first MPA having 8 SSPAs for producing 8 LHCP signal beams and may include a second MPA having 8 SSPAs for producing 8 RHCP signal beams. This is merely illustrative and, in general, satellite 12 may produce any desired number of signal beams having any desired polarizations.

Figure 4:
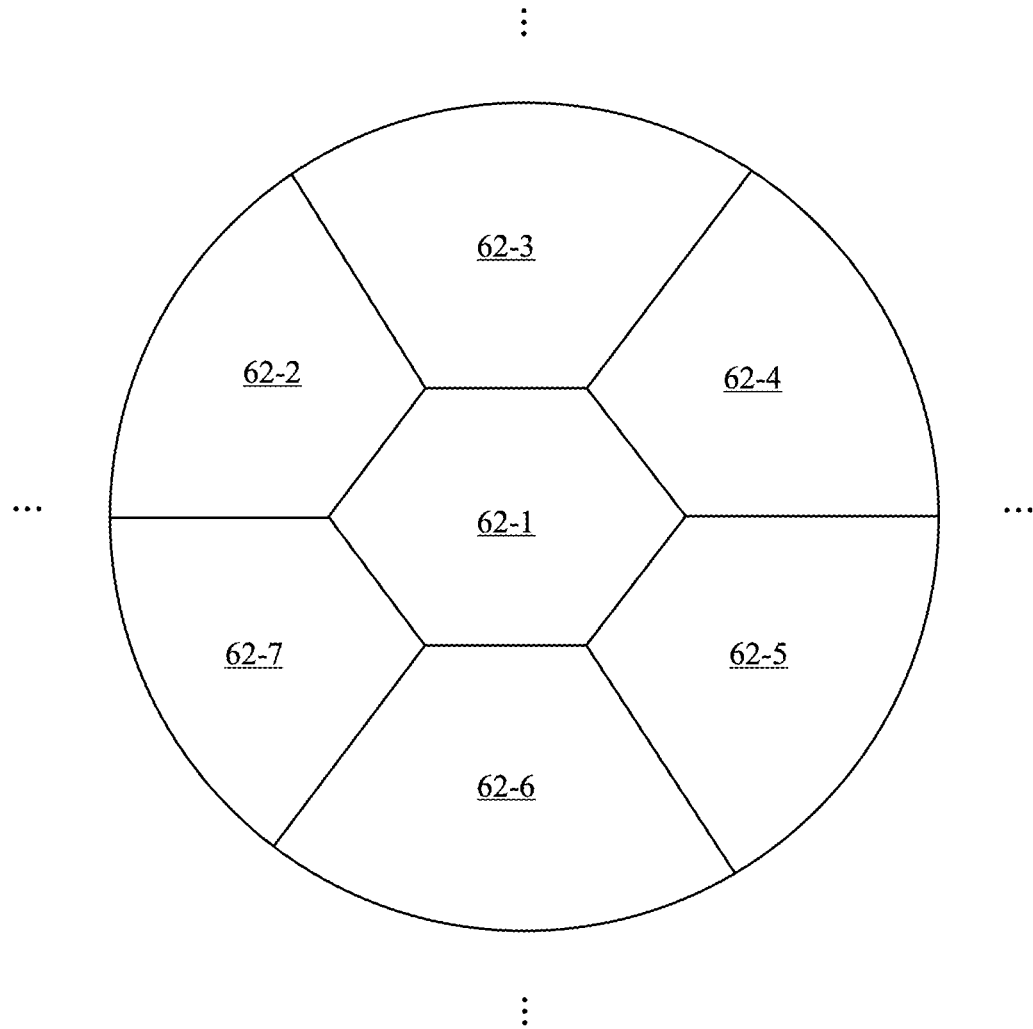
FIG. 4 is a diagram showing how an illustrative communications satellite may communicate using signal beams directed towards different cells distributed across a geographic region in accordance with some embodiments.

FIG. 4 is a diagram showing how a given satellite 12 may produce different signal beams for conveying radio-frequency signals within different cells on Earth. As shown in FIG. 4, satellite 12 may be capable of providing forward link and/or reverse link coverage across geographic region 60 at any given time. Geographic region 60 may sometimes be referred to herein as the coverage area of satellite 12. Geographic region 60 may span some or all of a city, county, state, province, country, continent, ocean, or any other desired region on Earth. Geographic region 60 may be a few miles, tens of miles, or hundreds of miles in diameter, for example.

Satellite 12 may be able to provide radio-frequency signal beams at different beam pointing angles towards Earth (e.g., by adjusting the phases and magnitudes of each antenna 54). Each beam pointing angle may overlap with a corresponding cell 62 within geographic region 60 (e.g., a first cell 62-1, a second cell 62-2, a third cell 62-3, etc.). The example of FIG. 4 in which satellite 12 produces seven signal beams for covering seven cells 62 is merely illustrative and, in general, satellite 12 may produce any desired number of signal beams for covering any desired number of cells (e.g., 16 cells, 32 cells, 4 cells, 8 cells, 64 cells, 128 cells, more than 16 cells, more than 7 cells, more than 4 cells, more than 32 cells, less than 7 cells, etc.). Cells 62 may have any desired diameter (e.g., 100-150 km, less than 100 km, greater than 150 km, less than 10 km, etc.). Cells 62 may have any desired shape.

Beam forming may allow satellite 12 to produce a single active radio-frequency signal beam and thus a single active cell at any given time or may produce multiple active radio-frequency signal beams and thus multiple active cells at any given time. In practice, satellite 12 has a finite amount of radio-frequency power that can be distributed across one or more cells 62. The radio-frequency power provided within each cell 62 also corresponds to the maximum data rate for satellite communications within the cell. In general, the greater number of cells 62 that are active at any given time, the less power (and maximum data rate) is provided to each cell by the satellite. For example, satellite 12 may have 81 dBW of power that can be focused on a single cell 62 or that can be distributed across some or all of cells 62. Satellite 12 may also control the amount of power provided to each cell 62 by increasing the amount of time that each cell 62 is active (e.g., the dwell time for that cell). The longer a given cell 62 is active, the more power is provided to that cell. If all cells 62 in geographic region 60 are active at once, there may be insufficient power-per-cell to support satisfactory radio-frequency communications with UE devices 10 in each cell (e.g., UE devices 10 may not be able to connect to satellite 12 or may not be able to convey large amounts of data unless there is a sufficient amount of radio-frequency power within the corresponding cell). If desired, satellite 12 may perform a beam hopping operation in which satellite 12 cycles through different active radio-frequency signal beams and thus active cells 62 over time. This may allow each active cell to be provided with a satisfactory amount of power while still providing coverage across all cells 62 in geographic region 60.

Satellite 12 may convey radio-frequency signals simultaneously within LHCP signal beams and RHCP signal beams. To help mitigate interference between cells 62, cells 62 may be divided into a set of RHCP cells and a set of LHCP cells. The odd-numbered cells 62 (e.g., cells 62-1, 62-3, 62-5, etc.) in geographic region 60 may be LHCP cells and the even-numbered cells 62 (e.g., cells 62-2, 62-4, 62-6, etc.) may be RHCP cells, for example. Given the resources available on satellite 12 and the need to support sufficiently high power (data rates) in each cell, satellite 12 may limit its active signal beams to a single signal beam of each polarization or to as many two signal beams of each polarization at any given time, for example. A signal beam is sometimes referred to herein as "active" when the signal beam is currently being used to convey radio-frequency signals (e.g., in the uplink or downlink direction) and is sometimes referred to herein as "inactive" when the signal beam is not currently being used to convey radio-frequency signals. Forward link data for each UE device within a given cell 62 may be transmitted within the corresponding signal beam (e.g., in the downlink signals transmitted to UE devices 10) sequentially and contiguously in time (e.g., where the forward link data for a subsequent UE device begins immediately upon the end of the forward link data for the previous UE device).

Each satellite 12 in satellite constellation 4 may provide communications capacity to a respective geographic region 60 on Earth. In practice, different UE devices 10 may be located in different geographic regions. There may be, for example, multiple UE devices in multiple cells 62 for multiple satellites 12 in satellite constellation 4. If care is not taken, it can be difficult to provide forward link data to each of these UE devices in a time-efficient manner given the current operating resources of communications system 8. Satcom cloud region 20 (FIG. 1) may include a satellite communications scheduler for scheduling forward link data transmissions for each of UE devices 10 in a time-efficient manner given the current operating resources of communications system 8.

Figure 5:
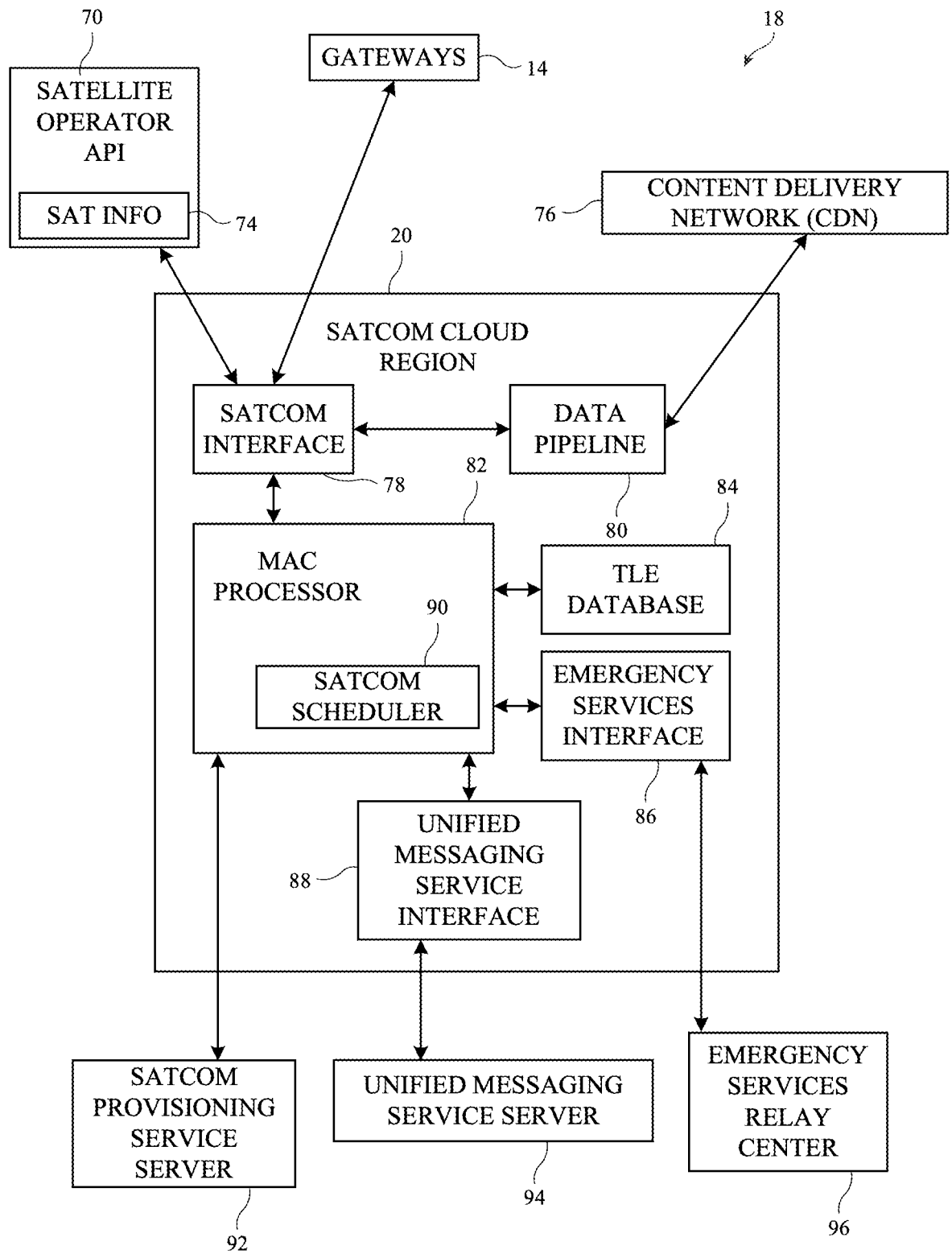
FIG. 5 is a diagram of an illustrative satellite communications cloud region having a satellite communications scheduler for scheduling the transmission of forward link data to multiple user equipment devices in accordance with some embodiments.

FIG. 5 is a diagram showing one example of how satcom cloud region 20 may include a satellite communications scheduler for scheduling forward link data transmissions. As shown in FIG. 5, satcom cloud region 20 may be communicably coupled to satellite operator application programming interface (API) 70 in network portion 18 and may be communicably coupled to gateways 14 (e.g., over wired and/or wireless links and/or other network nodes or subnetworks in network portion 18). Satcom cloud region 20 may also be communicably coupled to other entities in network portion 18 such as content delivery network (CDN) 76, satcom provisioning service (SPS) server 92, unified messaging service server 94, and/or emergency services relay center 96.

As shown in FIG. 5, satcom cloud region 20 may include a satellite communications interface (nexus) such as satcom interface 78, a satcom data pipeline such as data pipeline 80, a database such as TLE database 84, a medium access control (MAC) layer processor such as MAC processor 82, an emergency services interface such as emergency services interface 86, and a unified messaging service interface such as unified messaging service interface 88. MAC processor 82 may include scheduling elements such as satcom scheduler 90. Satcom scheduler 90 may perform forward link scheduling for UE devices 10 (e.g., satcom scheduler 90 may generate forward link schedules for the UE devices). Satcom scheduler 90 may perform forward link scheduling by assigning forward link traffic grants to each of the UE devices, for example.

Satcom interface 78 may serve as a networking (communications) interface or nexus between gateways 14, satellite operator API 70, CDN 76, and MAC processor 82. Unified messaging service interface 88 may serve as a networking interface between unified messaging service server 94 and MAC processor 82. Emergency services interface 86 may serve as a networking interface between emergency services relay center 96 and MAC processor 82. The components of satcom cloud region 20 may be implemented on (e.g., distributed across) one or more underlying hardware devices (e.g., user equipment devices, servers, network cards, racks, computers, network nodes, communication terminals, etc.) having one or more processors (e.g., processing circuitry such as processing circuitry 38 of FIG. 3) and storage (e.g., storage circuitry such as storage circuitry 36 of FIG. 2). The one or more processors may, for example, perform the operations of satcom cloud region 20 as described herein.

Satellite operator API 70 may be managed and operated by the satellite constellation operator. Satellite operator API 70 may store and maintain satellite information 74. Satellite operator API 70 may be implemented on one or more underlying terminals or nodes of network portion 18. Satellite information 74 may include operating information associated with each of the satellites 12 in satellite constellation 4. Satellite information 74 may, for example, include position information for each of satellites 12, yaw information for each of satellites 12, velocity information for each of satellites 12, sensor information gathered by each satellite 12 such as thermal sensor information, power information identifying the amount of power available at each satellite 12, beam information identifying signal beams that are formable by each satellite 12, etc. The thermal sensor information may identify thermal properties such as temperature at one or more locations on or within the satellite. Satellite operator 70 may provide satellite information 74 to satcom interface 78 of satcom cloud region 20. Satcom interface 78 may pass satellite information 74 to MAC processor 82 for use in scheduling forward link traffic.

Content delivery network 76 may produce and distribute content to be delivered to UE devices 10 (e.g., in forward link signals transmitted by gateways 14). The content may include application data, message data, video data, audio data, voice data, or any other desired content data. Content delivery network 76 may deliver content for the UEs to data pipeline 80 on satcom cloud region 20. Data pipeline 80 may convert the format of content received from content delivery network 76 to a format that can be used by satcom cloud region 20 to provide to UE devices 10 via satellite constellation 4. Data pipeline 80 may pass the content to MAC processor 82 via satcom interface 78, for example. Content delivery network 76 may be controlled and/or managed by the satcom network service provider and/or by other service providers.

TLE database 84 may be a database, data table, or any other desired data structure. TLE database 84 may store each version of the TLEs used by satellite constellation 4. Satellite operator API 70 may provide each current (updated) version of the TLE to satcom cloud region 20 when available.

Emergency services interface 86 may serve as an interface between satcom cloud region 20 and emergency services relay center 96. Emergency services relay center 96 may receive emergency messages from satcom cloud region 20 and may forward or relay the emergency messages to appropriate emergency services. For example, emergency services relay center 96 may receive an emergency message transmitted by a particular UE device (e.g., in reverse link signals) and may forward the emergency message to the emergency services provider for the geographic region where that UE device is located. If desired, emergency services relay center 96 may also forward messages from the emergency service provider to satcom cloud region 20 for transmission to UE devices 10 (e.g., in forward link signals).

Unified messaging service server 94 may serve as a gateway to messaging in a unified messaging service associated with satcom cloud region 20. Unified messaging service server 94 may, for example, handle notification services such as push notification services and other messaging services for UE devices 10. Unified messaging service server 94 may forward message data and/or notifications such as push notifications to UE devices 10 (e.g., for display using applications running on the UE devices) based on requests from other operators or application developers. Satcom cloud region 20 may forward the message data and/or notifications to UE devices 10 (e.g., in forward link signals transmitted by gateways 14). Unified messaging service server 94 may be controlled and/or managed by the satcom network service provider and/or by other service providers.

Satcom provisioning service server 92 may be communicably coupled to MAC processor 82. Satcom provisioning service server 92 may provision UE devices 10 for performing satellite communications using satellite constellation 4. Satcom provisioning service server 92 may, for example, handle authentication services and keys for authenticating UE devices 10 and for providing the UE devices with access to satellite constellation 4. The example of FIG. 5 is merely illustrative and, in general, any desired components of network portion 18 may communicate with satcom cloud region 20. Content delivery network 76, unified messaging service server 94, emergency services relay center 96, and/or any other desired nodes or terminals of network portion 18 may provide forward link data to satcom cloud region 20 for transmission to UE devices 10 via satellite constellation 4.

Satcom scheduler 90 may schedule transmission of the forward link data to UE devices 10. Satcom scheduler 90 may schedule forward link data transmission by assigning different forward link traffic grants to each of the UE devices that are to receive forward link data. Satcom scheduler 90 may perform forward link scheduling based on the forward link data to be transmitted, information received from UE devices 10 (e.g., in reverse link signals), and satellite information 74 in a manner that is time-efficient, that is fair to each of the UE devices 10, and that accounts for the constraints associated with satellites 12.

Figure 6:
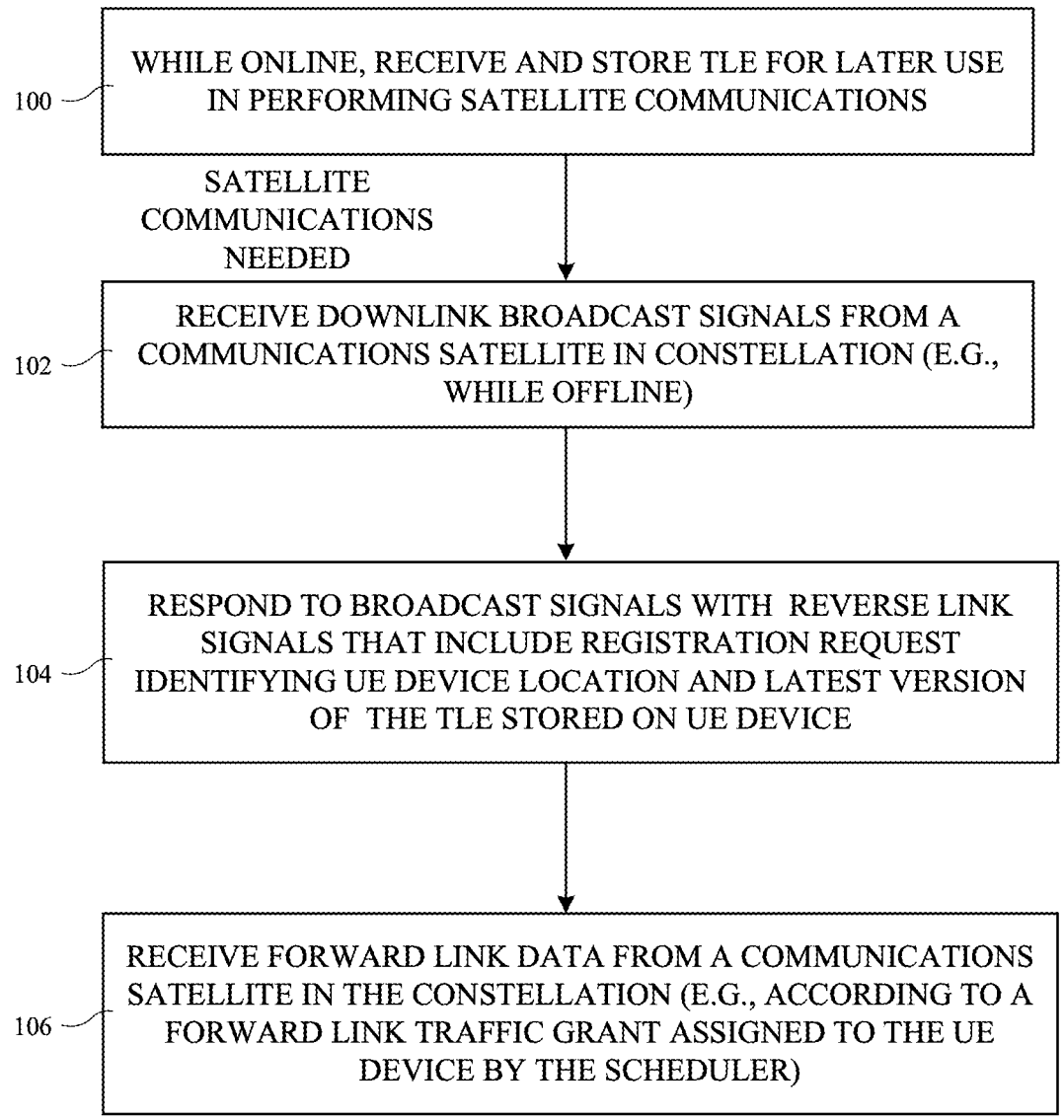
FIG. 6 is a flow chart of illustrative operations that may be performed by a user equipment device in receiving forward link data via a communications satellite in accordance with some embodiments.

FIG. 6 is a flow chart of illustrative operations that may be performed by a given UE device 10 to receive forward link data in forward link signals transmitted by a corresponding gateway 14 (e.g., as scheduled by satcom scheduler 90).

At operation 100, when UE device 10 is online, UE device 10 may receive a current (updated) TLE associated with satellite constellation 4 (e.g., via terrestrial network wireless communication link 2 of FIG. 1). UE device 10 may store the current TLE as TLE 42 of FIG. 2. UE device 10 may also store information identifying the version of the TLE that is stored on UE device 10. UE device 10 may later use the stored TLE during transmission of reverse link signals via satellite constellation 4.

UE device 10 may continue to perform communications with external communications equipment 22 (e.g., via terrestrial network wireless communication link 2) while the UE device is online (e.g., because terrestrial network wireless links generally support higher bandwidths and lower transmit power levels than satellite links). When satellite communications are needed, processing may proceed to operation 102. Satellite communications may be needed when UE device 10 is offline and when UE device 10 has reverse link data to transmit. As one example, satellite communications may be needed when UE device 10 is offline and when UE device 10 has an emergency message to transmit to an emergency service provider (e.g., because the user of UE device 10 has suffered an accident, is lost, is in danger, etc.). Because terrestrial network communications are not available to UE device 10 while offline, UE device 10 may instead send the emergency message via reverse link signals transmitted to satellite constellation 4.

At operation 102, UE device 10 may receive downlink broadcast signals transmitted by one of the satellites 12 in satellite constellation 4. Satellite 12 may periodically transmit the broadcast signals within each of the cells of its coverage area, for example. The broadcast signals may include a broadcast interval message, for example.

At operation 104, UE device 10 may respond to the broadcast signals with reverse link signals that include a registration request for UE device 10 to perform communications via satellite constellation 4 (e.g., receipt of the broadcast signals may trigger UE device 10 to register or sign up for subsequent satellite communications). The registration request may include information identifying the geographic location of device 10 and information identifying the version of TLE 42 stored on UE device 10 (e.g., a TLE version number or other TLE identifier). The information identifying the geographic location of device 10 may include a geographic location identified by UE device 10 based on satellite navigation signals received at UE device 10 (e.g., a GPS location of UE device 10).

At operation 106, UE device 10 may begin to receive forward link data transmitted by a gateway 14 via one of the communications satellites 12 in satellite constellation 4. The forward link data (e.g., the timing of the forward link data) may be scheduled by satcom scheduler 90 on satcom cloud region 20. If desired, UE device 10 may respond to the forward link data (e.g., over a bi-directional link).

Figure 7:
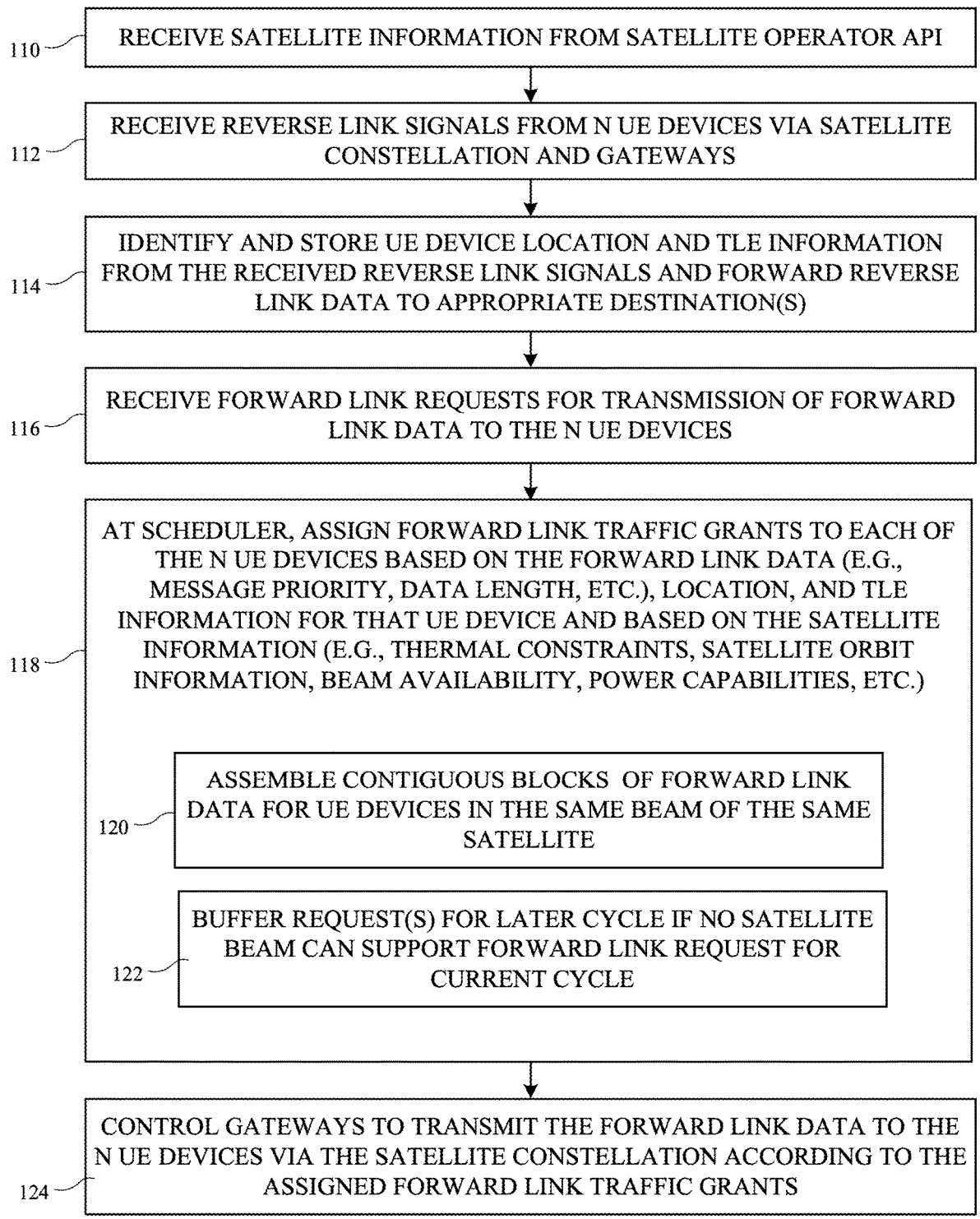
FIG. 7 is a flow chart of illustrative operations that may be performed by a satellite communications cloud region to schedule forward link data transmissions for multiple user equipment devices in accordance with some embodiments.

FIG. 7 is a flow chart of operations involved in using satcom cloud region 20 to schedule forward link data for multiple UE devices 10.

At operation 110, satcom cloud region 20 may receive satellite information 74 from satellite operator API 70. Satcom cloud region 20 may receive satellite information 74 periodically or whenever updated satellite information is available, for example. Operation 110 may be performed concurrently, before, or after operations 112, 114, and/or 116 of FIG. 7 if desired.

At operation 112, satcom cloud region 20 may receive reverse link signals (e.g., registration requests) from a set of N UE devices 10 via satellite constellation 4 and gateways 14 (e.g., as transmitted by UE devices 10 while performing operation 104 of FIG. 6).

At operation 114, satcom cloud region 20 may identify the geographic location for each of the N UE devices from the received reverse link information (e.g., using the GPS location of the UE devices as transmitted in the registration requests). If desired, satcom cloud region 20 may fuzz the geographic locations for privacy purposes (e.g., to coarsely identify the geographic location of the UE devices such as to within the nearest cell 62 but without identifying the exact location of the UE devices). Satcom cloud region 20 may also identify the TLE version used by each of the N UE devices (e.g., using the TLE version number as transmitted in the registration requests). Satcom cloud region 20 may store each of the geographic locations and TLE versions for subsequent processing (e.g., at TLE database 84). Satcom cloud region 20 may decode any reverse link data in the reverse link signals and may forward the reverse link data to corresponding destinations within network portion 18.

At operation 116, satcom cloud region 20 may receive forward link requests for the transmission of forward link data to each of the N UE devices 10. The forward link requests may be generated by elements of network portion 18 (e.g., in response to the reverse link data forwarded at operation 114) such as content delivery network 76, unified messaging service server 94, emergency services relay center 96, and/or other terminals of network portion 18. The forward link requests may identify the particular UE device 10 that is the intended recipient of the forward link data as well as the forward link data itself and optionally a message priority identifier, for example.

Consider one example in which satcom cloud region 20 receives a first forward link request for UE device 10-1 from emergency services relay center 96 and a second forward link request for UE device 10-2 from another communication terminal. The first forward link request may, for example, be received in response to an emergency message transmitted by UE device 10-1 in the reverse link signals and forwarded to emergency services relay center 96 at operation 114. The second forward link request may, for example, be a request for a push notification to be displayed at UE device 10-2 (e.g., from unified messaging service server 94). In this example, the first forward link request may be higher priority than the second forward link request because the first forward link request is related to emergency services. The first forward link request may therefore include a priority identifier that identifies the first forward link request as higher priority, whereas the second forward link request may include a priority identifier that identifies the second forward link request as lower priority.

At operation 118, scheduler 90 may schedule forward link transmissions for an upcoming forward link transmission cycle by assigning forward link traffic grants to each of the N UE devices for which forward link requests have been received. Each forward link transmission cycle may last a duration of 2.56 seconds, as an example. Scheduler 90 may generate (e.g., compute, calculate, produce, output, identify, assign, allocate, etc.) a forward link traffic grant for each of the received forward link requests based on the forward link data in the forward link request, the priority identifier in the forward link request, the length of the forward link data, satellite information 74 (e.g., thermal constraints as identified by satellite information 74, satellite orbit information as identified by satellite information 74, satellite beam availability information as identified by satellite information 74, satellite power capabilities as identified by satellite information 74, information on the available gateways 14 and the antennas on gateways 14, etc.), the geographic location of each of the N UE devices, and/or the TLE version of each of the N UE devices. This scheduling may be performed in a fair manner based on the forward link data, the geographic locations, the TLE versions, and the satellite-based constraints of satellite information 74.

In generating forward link traffic grants for the N UE devices 10, scheduler 90 may process the forward link requests in priority order, scheduling higher priority requests before lower priority requests. Within the same priority class, scheduler 90 may process the forward link requests on a first-in-time basis (e.g., in a time-order in which earlier-received requests are processed before later-received requests). For each of the forward link traffic grants, scheduler 90 may identify a particular satellite 12 in constellation 4 that will have a coverage area overlapping the geographic location of the corresponding UE devices 10 during the upcoming forward link transmission cycle (e.g., a satellite having visibility to the UE device). If multiple satellites 12 meet this criteria, scheduler 90 may assign the satellite having the highest elevation angle to the UE device. Scheduler 90 may then identify a particular beam on each of the satellites that will overlap each of the N UE devices (e.g., based on the beam availability information in satellite information 74 and the stored geographic locations of the UE devices). Scheduler 90 may, for example, select a beam based on the yaw of the satellite, the position of the satellite, and the speed of the satellite as identified by satellite information 74. In selecting satellites with visibility to the UE devices, scheduler 90 may perform orbit propagation on the satellites using the TLE version stored on each of the UE devices (e.g., as identified at operation 114) rather than the most up-to-date TLE version if there is a newer TLE available. This may ensure that the UE device and scheduler land on the same satellite and beam.

Scheduler 90 may also identify the gateways 14 that service the identified satellites, as well as the particular antennas on the identified gateways that service the identified satellites. Scheduler 90 may, for example, find all satellites 12 that have visibility or will have visibility to one or more antennas on one or more gateways 14. If desired, scheduler 90 may perform an initial power and thermal check for the satellite (e.g., using satellite information 74) to confirm whether the satellite is available (e.g., assuming 100% duty cycle utilization). The identified gateways may be gateways that can deliver desired power to the satellite given the gateway antenna's limits on effective isotropic radiated power (EIRP). If the power condition is met by multiple gateways 14, the scheduler may find the gateway that tracks the satellite at the highest elevation.

In assigning forward link traffic grants, scheduler 90 may also allocate data rate (power) to each of the N UE devices. If desired, scheduler 90 may dynamically allocate data rates to each of the forward link traffic grants based on the power capacity and thermal information in satellite information 74 (e.g., forward link data may be transmitted at higher data rates and power levels on satellites 12 having greater power capacity and lower thermal measurements than on satellites 12 having lower power capacity or higher thermal measurements). Satellites 12 having higher thermal measurements may be consuming a relatively high amount of power and/or may be at points in their orbits where the satellites are exposed to direct sunlight, for example.

When more than one of the N UE devices 10 are located in the same cell (signal beam) of the same satellite, scheduler 90 may assemble the forward link data for each of those UE devices as continuous/contiguous blocks of forward link data that sharing the same header (at operation 120). If there are no available satellites with sufficient power or a suitable beam overlapping any of the UE devices during the upcoming forward link transmission cycle, or if the thermal constraints received in satellite information 74 identify that a satellite 12 does not have the thermal capacity to accommodate the needed forward link traffic (e.g., because the satellite is located in the sun, is too hot, etc.), scheduler 90 may buffer the forward link requests for those UE devices until a later cycle (at operation 122). Alternatively, scheduler 90 may assign that forward link traffic a lower data rate (power level) if desired.

Scheduler 90 may perform a thermal assessment based on the thermal information in satellite information 74 to determine whether a given satellite 12 with UE visibility has sufficient thermal capacity to be assigned forward link data. The thermal assessment may involve generating and running a thermal model for the satellite. The thermal model may receive inputs that include thermal limits, sun incident angles α and β defined with respect to satellite 12 (e.g., where a is azimuth from x about the y-axis and β is elevation from the X-Z plane), temperature coefficients for α and β, gateway visibility, the thermal characteristics of satellite 12 during the last forward link transmission cycle, and/or average DC power dissipation for satellite 12, as examples. Scheduler 90 may use the thermal model to generate a predicted temperature for satellite 12 and may compare the predicted temperature to a temperature threshold value. If the predicted temperature is less than the temperature threshold, the satellite may have sufficient thermal capacity and scheduler 90 may scheduler that satellite for forward link traffic during the upcoming forward link transmission cycle. If the predicted temperature exceeds the temperature threshold, scheduler 90 may assign the UE devices for the satellite to a different satellite with both gateway and UE device visibility for the upcoming forward link transmission cycle or may buffer the corresponding forward link requests for transmission in a later forward link transmission cycle (e.g., at operation 122). The scheduler may save the (updated) state of the thermal model for use in the next forward link transmission cycle if desired.

Scheduler 90 may perform power-thermal (P-T) assessments in dynamically assigning data rates (power levels) to each of the UE devices. The P-T assessment may begin with a desired target radio-frequency (RF) power. The scheduler may then calculate backed-off target RF power from the desired target power. The scheduler may then perform a gateway EIRP power check. This may involve calculating combined signal power and finding the deliverable power to the satellite based on elevation angle and type of antenna (e.g., 68 dB vs 72 dB antennas). In cases with two simultaneous beams-per-polarization, the scheduler may route traffic to two gateways 14 if the gateways are both tracking the same satellite 12. The scheduler may then calculate the total RF power per polarization. If desired, the scheduler may add inter-modulation and thermal noise to the target RF power per MPA on the satellite. The scheduler may then find the expected power supply voltage Vdd for the satellite from the total RF power (e.g., using polynomial curve fitting with coefficients supplied in satellite information 74). The scheduler may then calculate DC consumption from the total RFF power and power supply voltage Vad (e.g., using polynomial curve fitting with coefficients supplied in satellite information 74). The scheduler may then calculate DC dissipation from the DC consumption and the total RF power (e.g., where DC dissipation is equal to the DC consumption minus the total RF power). The scheduler may take into account gateway visibility and the duty cycle of the requested forward link traffic. For example, the scheduler may identify the DC power consumption while the transmitter is on, the DC power consumption while the transmitter is off, the DC power dissipation while the transmitter is on, the DC power dissipation while the transmitter is off. If there is no gateway visibility, the average DC power consumption may be equal to the average dissipation.

If desired, the scheduler may also perform a watt-hour bank assessment in performing the P-T assessments. For example, the scheduler may check the satellite orbit as identified by satellite information 74 (e.g., to determine whether the orbit is an all-sun orbit located entirely in sunlight, eclipse information, post eclipse recharge information, etc.). The scheduler may choose an appropriate watt-hour bank from the satellite information 74 received from satellite operator API 70 (e.g., a post-eclipse watt-hour bank or an eclipse watt-hour bank). The scheduler may calculate reserve energy for the remaining time in this state (e.g., based on gateway visibility of the satellite for the remainder of the orbit, with expected utilization of the satellite per cycle at the expected desired target power level). The scheduler may calculate discretionary energy available for the upcoming forward link transmission cycle (e.g., where the discretionary energy is equal to the watt-hour bank minus the reserve energy). The scheduler may also calculate the watt-hour consumption for the forward link transmission cycle (e.g., where watt-hour consumption is equal to the DC consumption in watts times the duration of the cycle (e.g., 2.56 seconds)). The scheduler may deduct the watt-hour consumption from the watt-hour bank in updating the state.

At operation 124, satcom cloud region 20 may control gateways 14 to transmit the forward link data from the forward link requests to the N UE devices 10 via satellite constellation 4 according to the forward link schedule generated by scheduler 90 (e.g., according to the forward link traffic grants produced by scheduler 90). MAC processor 82 may forward the forward link traffic grants to the corresponding gateways 14 (via satcom interface 78) and the gateways may transmit the forward link data from the forward link traffic grants via satellites 12 according to the scheduling identified by the forward link traffic grants. Satellites 12 may relay the forward link data (e.g., in a bent-pipe configuration) to the N UE devices 10 (e.g., the UE devices may receive the forward link data while performing operation 106 of FIG. 6).

Figure 8:
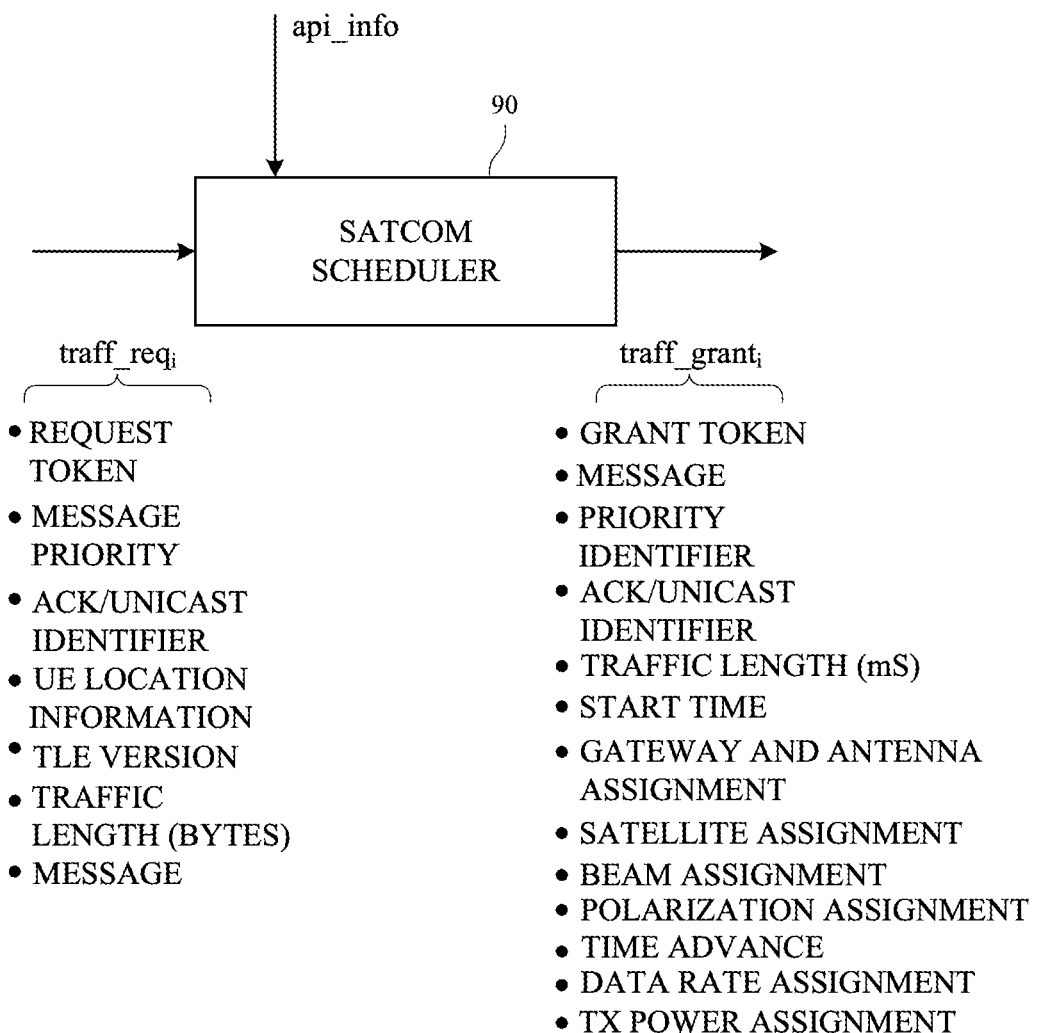
FIG. 8 is a diagram showing how an illustrative satellite communications scheduler may generate forward link traffic grants for different user equipment devices based on forward link traffic requests and satellite information in accordance with some embodiments.

FIG. 8 is a diagram showing one example of how scheduler 90 may generate forward link traffic grants based on received forward link traffic requests. As shown in FIG. 8, scheduler 90 may have a first input that receives respective forward link traffic requests traff_req$_i$ for each of the N UE devices 10 to receive forward link data (e.g., where i is an integer index for the UE devices from 1 to N). Scheduler 90 may have a second input that receives API information api_info from satellite operator API 70. API information api_info may include satellite information 74, for example. The satellite information 74 may include satellite orbit information (e.g., position and velocity information, orbital characteristics, etc.), beam capabilities, thermal information including thermal constraints and sensor values, and power information for each of the satellites 12 in satellite constellation 4, for example.

Scheduler 90 may generate respective forward link traffic grants traff_grant$_i$ for each of the N UE devices 10 based on the corresponding traffic request traff_req$_i$ and based on API information api_info (e.g., while processing operation 118 of FIG. 7). As shown in FIG. 8, each forward link traffic request traff_req$_i$ may include or identify the forward link data to be transmitted (e.g., a forward link message), a request token for the corresponding UE device 10, information identifying the priority of the forward link data (e.g., the message priority), the time of the request, an ack/unicast identifier that identifies the type of request (e.g., whether the forward link data includes an acknowledgement (ack) or unicast data), UE location information identifying the geographic location of the corresponding UE device (e.g., as identified at operation 114 of FIG. 7), the TLE version of the corresponding UE device (e.g., as identified at operation 114 of FIG. 7), and/or information identifying the length of the forward link data (e.g., in bytes).

The API information api_info received at scheduler 90 may include, for example, a list of gateways 14 and antennas on the gateways for use in communicating with satellites 12, a list of antenna elevation powers, a list of high precision TLEs characterizing satellite constellation 4, a list of power limits for satellites 12, a list of satellite contacts for satellites 12, a list of satellite eclipses for satellites 12, a scheduler report for satellites 12 (e.g., a report produced by an API that pre-calculates yaw, angles α and β, etc. ahead of time or offline so resources do not need to be assigned to calculate these values during scheduling of cycle traffic), thermal parameters for satellites 12, waveform backoffs for satellites 12, and/or any other desired information. These lists may be generated by satellite operator API 70 in a json file format, as one example.

Each forward link traffic grant traff_grant$_i$ may include or identify a grant token for the corresponding UE device, the forward link data (e.g., message) from the corresponding forward link traffic request traff_req$_i$, a priority identifier P identifying the priority of the forward link traffic grant (e.g., based on the message priority received in the corresponding forward link traffic request traff_req$_i$), the ack/unicast identifier, information identifying the length of the forward link data (e.g., in ms), a start time for the forward link traffic grant, information identifying the gateway 14 and the antenna on that gateway assigned to transmit the forward link data, information identifying the satellite 12 in satellite constellation 4 assigned to relay the forward link data, information identifying the particular signal beam of the satellite 12 to be used to transmit the forward link data to the corresponding UE device (e.g., the signal beam that overlaps the geographic location of the UE device), information identifying a polarization assignment for the corresponding UE beam (e.g., LHCP or RHCP), a time advance for the forward link data, information identifying the data rate (power) assignment for transmission of the forward link data, and/or information identifying the transmit (TX) power assigned for transmission of the forward link data in the signal beam. Scheduler 90 may provide forward link traffic grants traff_grant$_i$ to the corresponding gateways (e.g., as identified within the traffic grants) for transmission to UE devices 10 (e.g., according to the configuration settings and timing specified by the traffic grants).

Consider a simple example in which UE device 10-1 of FIG. 1 is located within cell 62-2 of FIG. 4 and UE device 10-2 of FIG. 1 is located within cell 62-3 of FIG. 4 (e.g., within the coverage area of the same satellite 12) and in which both UE devices are to receive forward link data with the same priority. In this example, scheduler 90 may receive a first forward link traffic request traff_req$_1$ for UE device 10-1 and a second forward link traffic request traff_req$_2$ for UE device 10-2 after receiving forward link traffic request traff_req$_1$. Forward link traffic request traff_req$_1$ may identify that UE device 10-1 is located within cell 62-2 and may identify the TLE version stored on UE device 10-1. Forward link traffic request traff_req$_2$ may identify that UE device 10-2 is located within cell 62-3 and may identify the TLE version stored on UE device 10-2. Scheduler 90 may process forward link traffic request traff_req$_1$ based on API information api_info to generate a forward link traffic grant traff_grant$_1$ for UE device 10-1. Similarly, scheduler 90 may process forward link traffic request traff_req$_2$ based on API information api_info to generate a forward link traffic grant traff_grant$_2$ for UE device 10-2.

Because the forward link traffic requests have the same priority, scheduler 90 will process the first request received (e.g., forward link traffic request traff_req$_1$). Scheduler 90 may first compute the orbits of the satellites 12 in satellite constellation 4 using the TLE version for UE device 10-1 to identify a satellite 12 that will have a coverage area (e.g., geographic region 60 of FIG. 4) that overlaps UE device 10-1 for the upcoming forward link transmission cycle. Scheduler 90 may then process the beam information, polarization information, and/or orbit information for that satellite 12 (e.g., from API information api_info) to identify the signal beam overlapping UE device 10-1 within cell 62-2. Scheduler 90 may perform a power-thermal assessment on the satellite based on the thermal information received in API information api_info to determine whether the satellite can support forward link communications for UE device 10-1. For example, scheduler 90 may generate a thermal model for the satellite based on the thermal information in API information api_info to generate (e.g., identify, compute, calculate, produce, output, etc.) a predicted temperature for the satellite. If the predicted temperature is less than a threshold temperature, the satellite can support the forward link communications and can be assigned to UE device 10-1 within forward link traffic grant traff_grant$_1$. If the predicted temperature exceeds the threshold temperature, scheduler 90 may find another satellite 12 with a coverage area overlapping cell 62-2 to check to see if that satellite can handle the forward link communications or, if no such satellite is available, scheduler 90 may buffer forward link traffic request traff_req$_1$ for a subsequent forward link transmission cycle.

Once the satellite 12 and the corresponding signal beam for UE device 10-1 have been identified (assigned), scheduler 90 may generate (e.g., assign, identify, compute, calculate, output, produce, etc.) a data rate and transmit power for conveying the forward link data to UE device 10 via the assigned satellite and signal beam (e.g., by performing P-T assessments and/or watt-hour assessments on the assigned satellite). Scheduler 90 may include information identifying the data rate and transmit power in forward link traffic grant traff_grant$_1$. Scheduler 90 may then perform the same process on forward link traffic request traff_req$_2$ to produce forward link traffic grant traff_grant$_2$. Scheduler 90 may repeat this process for each forward link traffic request traff_req$_i$ to generate forward link traffic grants traff_grant$_i$ for each of the N UE devices 10 (e.g., processing the requests first in order of priority and then in time-order within each priority).

Figure 9:
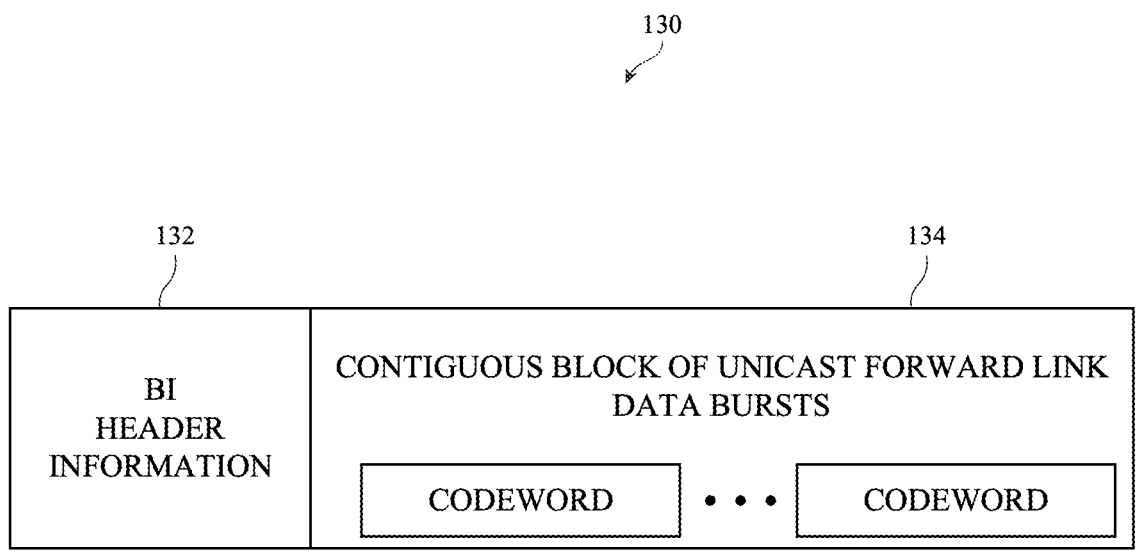
FIG. 9 is a diagram of an illustrative forward link data block that may be transmitted by a communications satellite within a corresponding signal beam in accordance with some embodiments.

For any given forward link transmission cycle, each satellite 12 may transmit the forward link data for all of the UE devices located in any given cell 62 (e.g., overlapping any given signal beam) within a forward link data block such as forward link data block 130 of FIG. 9. As shown in FIG. 9, forward link data block 130 may include broadcast interval (BI) header information 132 followed by a contiguous block 134 of forward link data bursts. Header 132 may, for example, a single codeword that informs the UE devices in the corresponding cell whether the UE devices should wake up to receive forward link data. UE devices that do not have forward link data to receive are not instructed to wake up. The broadcast interval occurs at a fixed position relative to each forward link transmission cycle, so the UE devices may know when to listen for the receipt of forward link data blocks 130.

Contiguous block 134 may include a series of forward link data bursts, where each forward link data burst is a unicast user data burst destined for a respective UE device in the corresponding cell. Each forward link data burst may include one or more code words. Each forward link data burst is contiguous with one or two other forward link data bursts (e.g., without any gap between the forward link data bursts). The forward link data bursts may be in priority order and then in time-order within each priority. Consider an example in which UE devices 10-1, 10-2, and 10-3 of FIG. 1 are located within the same cell 62 of FIG. 4 (e.g., within the same signal beam of a given polarization), where UE device 10-3 is to receive high priority data, UE devices 10-1 and 10-2 are to receive low priority data, and the forward link traffic request for UE device 10-2 was received at scheduler 90 before the forward link traffic request for UE device 10-1. In this example, contiguous block 134 may include a first forward link data burst for UE device 10-3, which is followed immediately and contiguously by a second forward link data burst for UE device 10-2, which is followed immediately and contiguously by a third forward link data burst for UE device 10-1. The gateway 14 assigned to UE devices 10-1, 10-2, and 10-3 may control satellite 12 to transmit forward link data block 130 within the signal beam overlapping UE devices 10-1, 10-2, and 10-3, with the data rate and transmit power assigned by the forward link traffic grants traff_grant$_i$ for UE devices 10-1, 10-2, and 10-3.

Figure 10:
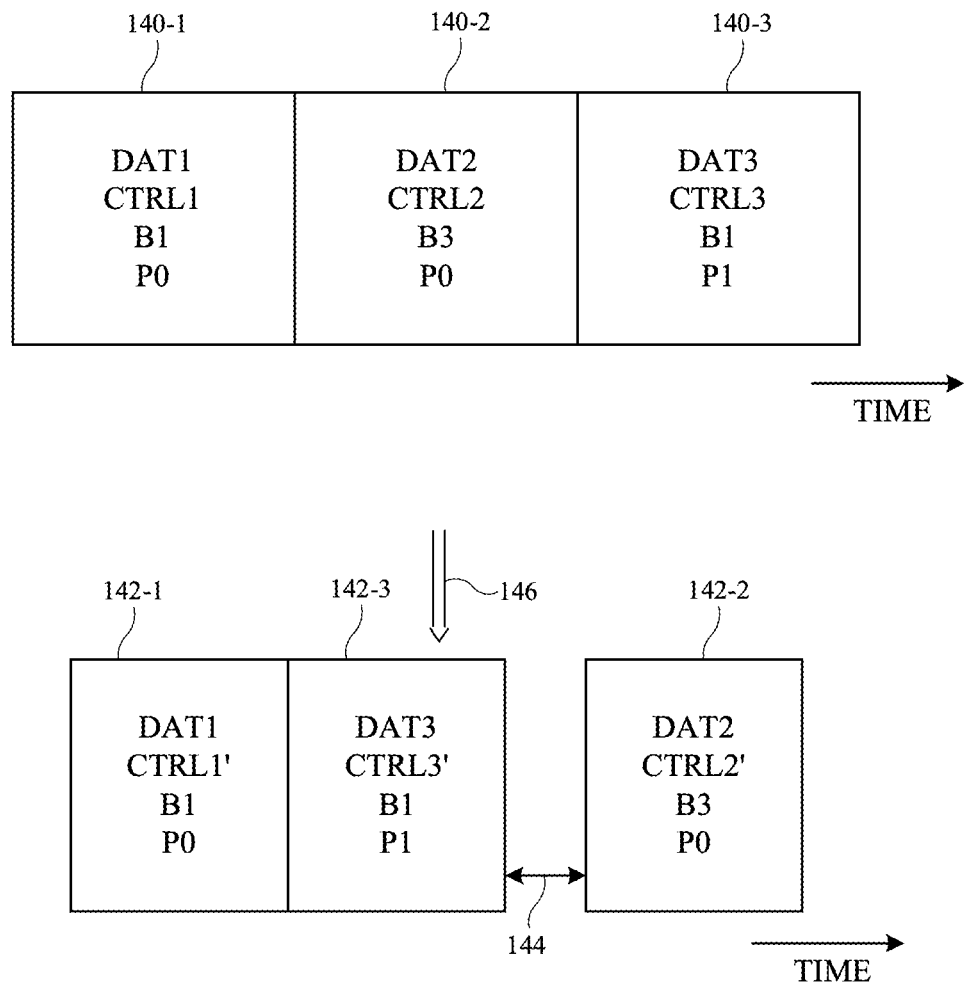
FIG. 10 is a diagram showing one example of how an illustrative communications scheduler may rearrange forward link data blocks for different user equipment devices based on priority and signal beam in accordance with some embodiments.

The examples above in which the forward link traffic grants are generated in priority order and then in time-order within each priority is merely illustrative. If desired, scheduler 90 may generate forward link traffic grants in priority order and then in time order within each priority but may order forward link traffic grants for any given signal beam consecutively (e.g., to produce forward link data blocks 130 of FIG. 9) to more efficiently utilize the resources on satellite 12. FIG. 10 is a timing diagram showing one such example of how scheduler 90 may implement fair, priority-based scheduling for three UE devices 10 that are to receive forward link data.

In the example of FIG. 10, there may be a first UE device 10-1 located within cell 62-1 of FIG. 4, a second UE device 10-2 located within cell 62-3, and a third UE device 10-3 located within cell 62-1. In this example, scheduler 90 first receives a first forward link traffic request 140-1 for UE device 10-1, then receives a second forward link traffic request 140-2 for UE device 10-2, and then receives a third forward link traffic request 140-3 for UE device 10-3. First forward link traffic request 140-1 may include forward link data DAT1 for transmission to UE device 10-1, a relatively high priority P0, and control information CTRL1 that includes all of the other information from the forward link traffic request. Second forward link traffic request 140-2 may include forward link data DAT2 for transmission to UE device 10-2 and may also have relatively high priority P0. Second forward link traffic request 140-2 may also include control information CTRL2 that includes all of the other information from the forward link traffic request. Third forward link traffic request 140-3 may include forward link data DAT3 for transmission to UE device 10-3 and may have a relatively low priority P1. Third forward link traffic request 140-3 may also include control information CTRL3 that includes all of the other information from the forward link traffic request.

Scheduler 90 may process forward link traffic requests 140-1, 140-2, and 140-3 to produce respective forward link traffic grants 142-1, 142-2, and 142-3, as shown by arrow 146. Because forward link traffic request 140-3 is destined for the same cell and signal beam as forward link traffic request 140-1, scheduler 90 may schedule forward link traffic grant 142-3 immediately after forward link traffic grant 142-1 and may schedule forward link traffic grant 142-2 after forward link traffic grant 142-3. Forward link traffic grant 142-3 may be scheduled after forward link traffic grant 142-1 because forward link traffic grant 142-3 is lower priority than forward link traffic grant 142-1. If desired, scheduler 90 may schedule a time gap 144 between forward link traffic grants 142-3 and 142-2 to allow room for preambles for synchronization and UE wake up intervals. Forward link traffic grants 142-1 and 142-3 may include information identifying the signal beam B1 to be used for UE devices 10-1 and 10-3. Forward link traffic grant 142-1 may also include priority identifier P0 identifying its high priority whereas forward link traffic grant 142-3 includes priority identifier P1 identifying its low priority. Forward link traffic grant 142-1 may include control information CTRL1' that includes all of the other information from the forward link traffic grant. Forward link traffic grant 142-3 may include control information CTRL3' that includes all of the other information from the forward link traffic grant. Forward link traffic grant 142-2 may include information identifying the signal beam B3 to be used for UE device 10-3, priority identifier P0, and control information CTRL2' that includes all of the other information from the forward link traffic grant. In this example, UE devices 10-1, 10-2, and 10-3 are each to receive forward link signals with the same polarization. In this way, scheduler 90 may schedule traffic for all beams that belong to the same polarization for a given satellite 12 beginning with the highest priority messages and with a first-come-first-served scheme within each priority, but may re-order the traffic schedule so that traffic for the same signal beam is sent out before the traffic for other signal beams (e.g., because the traffic destined for any single signal beam needs to be contiguous). If there is more traffic than can be accommodated per polarization, scheduler 90 may set a congestion flag for the satellite if desired.

One or more of the components of communications system 8 such as UE devices 10 may gather and/or use personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more aspects, at least one of the components set forth in one or more of the preceding figures may be configured to perform one or more operations, techniques, processes, or methods as set forth in the example section below. For example, the control circuitry as described above in connection with one or more of the preceding figures may be configured to operate in accordance with one or more of the examples set forth below. For another example, circuitry associated with a UE device, base station, gateway, satellite, network element, satellite communications network, satcom cloud region, scheduler, etc. as described above in connection with one or more of the preceding figures may be configured to operate in accordance with one or more of the examples set forth below in the example section.

Examples

In the following sections, further exemplary aspects are provided.

Example 1 includes a method of operating one or more processors in a satellite communications network to schedule forward link data transmissions via a constellation of communications satellites, the method comprising: generating a first forward link traffic grant of a forward link transmission cycle for a first user equipment (UE) device based on a first forward link traffic request having a first priority, wherein the first forward link traffic grant identifies a first signal beam of the communications satellite for use in transmitting first forward link data to the first UE device; generating a second forward link traffic grant of the forward link transmission cycle for a second UE device based on a second forward link traffic request having a second priority lower than the first priority, wherein the second forward link traffic grant identifies a second signal beam of the communications satellite for use in transmitting second forward link data to the second UE device; scheduling the second forward link traffic grant prior to the first forward link traffic grant in the forward link transmission cycle; and controlling one or more gateways to transmit, via the communications satellite, the first forward link data based on the first forward link traffic grant and the second forward link data based on the second forward link traffic grant.

Example 2 includes the method of example 1 or some other example or combination of examples herein, further comprising: generating a third forward link traffic grant of the forward link transmission cycle for a third UE device based on a third forward link traffic request having the first priority, wherein the third forward link traffic grant identifies the second signal beam of the communications satellite for use in transmitting third forward link data to the third UE device; scheduling the third forward link traffic grant prior to the second forward link traffic grant in the forward link transmission cycle; and controlling the one or more gateways to transmit, via the communications satellite, the third forward link data based on the third forward link traffic grant.

Example 3 includes the method of example 2 or some other example or combination of examples herein, wherein scheduling the third forward link traffic grant prior to the second forward link traffic grant comprises scheduling an end of the third forward link traffic grant to be contiguous with a beginning of the second forward link traffic grant.

Example 4 includes the method of example 3 or some other example or combination of examples herein, wherein scheduling the second forward link traffic grant prior to the first forward link traffic grant comprises scheduling a time gap between an end of the second forward link traffic grant and a beginning of the first forward link traffic grant.

Example 5 includes method of example 3 or some other example or combination of examples herein, wherein the first forward link traffic grant identifies a first polarization for the first signal beam and the second forward link traffic grant identifies a second polarization that is different from the first polarization for the second signal beam.

Example 6 includes method of example 1 or some other example or combination of examples herein, wherein the second signal beam is oriented at a different beam pointing angle than the first signal beam.

Example 7 includes the method of example 1 or some other example or combination of examples herein, wherein the first forward link data comprises a message from an emergency services provider.

Example 8 includes a method of operating one or more processors to schedule forward link data transmissions to one or more user equipment (UE) devices via a constellation of communications satellites, the method comprising: receiving satellite information that identifies thermal capacity of the communications satellites in the constellation; generating forward link traffic grants for the one or more UE devices based on the thermal capacity identified by the satellite information; and controlling one or more gateways to transmit forward link signals to the one or more UE devices via the constellation of communications satellites based on the forward link traffic grants.

Example 8 includes the method of example 8 or some other example or combination of examples herein, wherein the satellite information identifies power availability for the communications satellites in the constellation and wherein generating the forward link traffic grants comprises: assigning data rates to the one or more UE devices based on the power availability identified by the satellite information.

Example 9 includes the method of example 9 or some other example or combination of examples herein, wherein receiving the satellite information comprises receiving the satellite information from an application programming interface (API) of an operator of the constellation of communications satellites.

Example 11 includes the method of example 8 or some other example or combination of examples herein, wherein generating the forward link traffic grants comprises: generating a thermal model for a communications satellite in the constellation; generating a predicted temperature for the communications satellite based on the thermal model and the thermal capacity identified by the satellite information; and assigning a UE device from the one or more UE devices to the satellite when the predicted temperature is less than a threshold temperature.

Example 12 includes the method of example 11 or some other example or combination of examples herein, wherein generating the forward link traffic grants further comprises: assigning the UE device to an additional satellite when the predicted temperature exceeds the threshold temperature.

Example 13 includes the method of example 8 or some other example or combination of examples herein, further comprising: receiving, via the constellation, reverse link signals from the one or more UE devices, wherein the reverse link signals identify geographic locations of the one or more UE devices and wherein generating the forward link traffic grants comprises generating the forward link traffic grants based on the geographic locations.

Example 14 includes the method of example 13 or some other example or combination of examples herein, further comprising: identifying a set of communications satellites in the constellation having visibility to the one or more UE devices based on the geographic locations and based on communications satellite positions identified by the satellite information, wherein generating the forward link traffic grants comprises: generating thermal models for the set of communications satellites, generating predicted temperatures for the set of communications satellites based on the thermal models and the thermal capacity identified by the satellite information, and assigning UE devices from the one or more UE devices to the communications satellites in the set of communications satellites having predicted temperatures that are less than a threshold temperature.

Example 15 includes a method of operating one or more processors in a satellite communications network to schedule data transmissions via a constellation of communications satellites, the method comprising: receiving, via the constellation, a registration request transmitted by a user equipment (UE) device, wherein the registration request identifies a two-line element (TLE) identifier indicative of a version of a TLE that is stored on the UE device; generating a forward link traffic grant for the UE device based on the TLE identifier; and controlling a gateway to transmit forward link data to the UE device via the constellation based on the forward link traffic grant.

Example 16 includes the method of example 15 or some other example or combination of examples herein, wherein generating the forward link traffic grant comprises: identifying, using the TLE identified by the TLE identifier, a communications satellite in the constellation having a signal beam that overlaps the UE device.

Example 17 includes the method of example 15 or some other example or combination of examples herein, further comprising: receiving, from an operator of the satellite constellation, an additional TLE that is more recent than the TLE identified by the TLE identifier; and storing the additional TLE in a database.

Example 18 includes the method of example 15 or some other example or combination of examples herein, wherein generating the forward link traffic grant further comprises: receiving a thermal constraint associated with the communications satellite; generating a thermal model for the communications satellite; generating a predicted temperature for the communications satellite based on the thermal model and the thermal constraint; and assigning the communications satellite to the UE device when the predicted temperature is less than a threshold temperature.

Example 19 includes the method of example 18 or some other example or combination of examples herein, wherein generating the forward link traffic grant comprises buffering the forward link traffic grant for a later forward link transmission cycle when the predicted temperature exceeds the threshold temperature.

Example 20 includes the method of example 18 or some other example or combination of examples herein, further comprising, when the predicted temperature exceeds the threshold temperature: identifying, using the TLE identified by the TLE identifier, an additional communications satellite in the constellation having an additional signal beam that overlaps the UE device, wherein generating the forward link traffic grant further comprises: generating an additional thermal model for the additional communications satellite, generating an additional predicted temperature for the additional communications satellite based on the additional thermal model, and assigning the additional communications satellite to the UE device when the additional predicted temperature is less than the threshold temperature.

Example 21 may include an apparatus comprising means to perform one or more elements of a method described in or related to any of examples 1-20 or any combination thereof, or any other method or process described herein.

Example 22 may include one or more non-transitory computer-readable media comprising instructions to cause an electronic device, upon execution of the instructions by one or more processors of the electronic device, to perform one or more elements of a method described in or related to any of examples 1-20 or any combination thereof, or any other method or process described herein.

Example 23 may include an apparatus comprising logic, modules, or circuitry to perform one or more elements of a method described in or related to any of examples 1-20 or any combination thereof, or any other method or process described herein.

Example 24 may include a method, technique, or process as described in or related to any of examples 1-20 or any combination thereof, or portions or parts thereof.

Example 25 may include an apparatus comprising: one or more processors and one or more non-transitory computer-readable storage media comprising instructions that, when executed by the one or more processors, cause the one or more processors to perform the method, techniques, or process as described in or related to any of examples 1-20, or any combination thereof, or portions thereof.

Example 26 may include a signal as described in or related to any of examples 1-20, or any combination thereof, or portions or parts thereof.

Example 27 may include a datagram, information element, packet, frame, segment, PDU, or message as described in or related to any of examples 1-20, or any combination thereof, or portions or parts thereof, or otherwise described in the present disclosure.

Example 28 may include a signal encoded with data as described in or related to any of examples 1-20, or any combination thereof, or portions or parts thereof, or otherwise described in the present disclosure.

Example 29 may include a signal encoded with a datagram, IE, packet, frame, segment, PDU, or message as described in or related to any of examples 1-20, or any combination thereof, or portions or parts thereof, or otherwise described in the present disclosure.

Example 30 may include an electromagnetic signal carrying computer-readable instructions, wherein execution of the computer-readable instructions by one or more processors is to cause the one or more processors to perform the method, techniques, or process as described in or related to any of examples 1-20, or any combination thereof, or portions thereof.

Example 31 may include a computer program comprising instructions, wherein execution of the program by a processing element is to cause the processing element to carry out the method, techniques, or process as described in or related to any of examples 1-20, or any combination thereof, or portions thereof.

Example 32 may include a signal in a wireless network as shown and described herein.

Example 33 may include a method of communicating in a wireless network as shown and described herein.

Example 34 may include a system for providing wireless communication as shown and described herein.

Example 35 may include a device for providing wireless communication as shown and described herein.

Any of the above-described examples may be combined with any other example (or combination of examples), unless explicitly stated otherwise. The foregoing description of one or more implementations provides illustration and description but is not intended to be exhaustive or to limit the scope of aspects to the precise form disclosed.

The foregoing is merely illustrative and various modifications can be made to the described embodiments. The foregoing embodiments may be implemented individually or in any combination.

What is claimed is:

1. A method of operating one or more processors in a satellite communications network to schedule forward link data transmissions via a constellation of communications satellites, the method comprising:
   generating a first forward link traffic grant of a forward link transmission cycle for a first user equipment (UE) device based on a first forward link traffic request having a first priority, wherein the first forward link traffic grant identifies a first signal beam of a communications satellite in the constellation for use in transmitting first forward link data to the first UE device;
   generating a second forward link traffic grant of the forward link transmission cycle for a second UE device based on a second forward link traffic request having a second priority lower than the first priority, wherein the second forward link traffic grant identifies a second signal beam of the communications satellite for use in transmitting second forward link data to the second UE device;
   scheduling the second forward link traffic grant prior to the first forward link traffic grant in the forward link transmission cycle; and
   controlling one or more gateways to transmit, via the communications satellite, the first forward link data based on the first forward link traffic grant and the second forward link data based on the second forward link traffic grant.

2. The method of claim 1, further comprising:
   generating a third forward link traffic grant of the forward link transmission cycle for a third UE device based on a third forward link traffic request having the first priority, wherein the third forward link traffic grant identifies the second signal beam of the communications satellite for use in transmitting third forward link data to the third UE device;
   scheduling the third forward link traffic grant prior to the second forward link traffic grant in the forward link transmission cycle; and
   controlling the one or more gateways to transmit, via the communications satellite, the third forward link data based on the third forward link traffic grant.

3. The method of claim 2, wherein scheduling the third forward link traffic grant prior to the second forward link traffic grant comprises scheduling an end of the third forward link traffic grant to be contiguous with a beginning of the second forward link traffic grant.

4. The method of claim 3, wherein scheduling the second forward link traffic grant prior to the first forward link traffic grant comprises scheduling a time gap between an end of the second forward link traffic grant and a beginning of the first forward link traffic grant.

5. The method of claim 3, wherein the first forward link traffic grant identifies a first polarization for the first signal beam and the second forward link traffic grant identifies a second polarization that is different from the first polarization for the second signal beam.

6. The method of claim 1, wherein the first forward link data comprises a message from an emergency services provider.

7. A method of operating one or more processors in a satellite communications network to schedule forward link data transmissions via a constellation of communications satellites, the method comprising:
   transmitting a first forward link traffic grant of a forward link transmission cycle to one or more gateways, wherein the first forward link traffic grant identifies a first message for a first user equipment (UE) device, a first signal beam of a communications satellite in the constellation to be used to transmit the first message to the first UE device, a first time at which the first message is to be transmitted by the first communications satellite to the first UE device, and a first priority associated with the first message; and
   transmitting a second forward link traffic grant of the forward link transmission cycle to the one or more gateways, wherein the second forward link traffic grant identifies a second message for a second UE device, a second signal beam of the communications satellite to be used to transmit the second message to the second UE device, a second time at which the second message is to be transmitted to the second UE device, and a second priority associated with the second message, wherein
   the second priority is lower than the first priority, and the second time is prior to the first time in the forward link transmission cycle.

8. The method of claim 7, wherein the second forward link traffic grant is transmitted to the one or more gateways after the first forward link traffic grant.

9. The method of claim 7, wherein the first forward link traffic grant identifies a polarization to be used by the communications satellite to transmit the first message and wherein the second forward link traffic grant identifies that the communications satellite is to transmit the second message using the polarization.

10. The method of claim 7, wherein the first forward link traffic grant identifies a first polarization to be used by the communications satellite to transmit the first message and wherein the second forward link traffic grant identifies a second polarization to be used by the communications satellite to transmit the second message, the second polarization being different from the first polarization.

11. The method of claim 7, further comprising:
   transmitting a third forward link traffic grant of the forward link transmission cycle to the one or more gateways, wherein the third forward link traffic grant identifies a third message for a third UE device, that the first signal beam of the communications satellite is to be used to transmit the third message to the third UE device, a third time at which the third message is to be transmitted to the third UE device, and a third priority associated with the third message, wherein
   the third priority is higher than the second priority, and the third time is prior to the second time in the forward link transmission cycle.

12. The method of claim 11, wherein the third priority is equal to the first priority.

13. The method of claim 11, wherein the first forward link traffic grant identifies a polarization to be used by the communications satellite to transmit the first message, the second forward link traffic grant identifies that the communications satellite is to transmit the second message using the polarization, and the third forward link traffic grant identifies that the communications satellite is to transmit the third message using the polarization.

14. The method of claim 11, wherein the first forward link traffic grant identifies a first polarization to be used by the communications satellite to transmit the first message, the second forward link traffic grant identifies that the communications satellite is to transmit the second message using a second polarization different from the first polarization, and the third forward link traffic grant identifies that the communications satellite is to transmit the third message using the second polarization.

15. The method of claim 7, wherein the first time comprises a first time period, the second time comprises a second time period, the second time period is separated from the first time period by a gap, and the communications satellite does not transmit data during the gap between the first time period and the second time period.

16. The method of claim 7, wherein the first message comprises a message from an emergency services provider.

17. A method of operating a satellite communications network to transmit forward link data to one or more user equipment (UE) devices via a constellation of communications satellites, the method comprising:

transmitting, using a first signal beam of a communications satellite in the constellation, a first message to a first UE device during a first time period in a forward link transmission cycle, the first message having a first priority; and transmitting, using a second signal beam of the communications satellite, a second message to a second UE device during a second time period in the forward link transmission cycle that is non-overlapping with respect to the first time period, the second message having a second priority lower than the first priority, and the second time period being prior to the first time period in the forward link transmission cycle.

18. The method of claim 17, further comprising:

transmitting, using the second signal beam of the communications satellite, a third message to a third UE device during a third time period in the forward link transmission cycle, the third message having the first priority, and the third time period being prior to the second time period in the forward link transmission cycle.

19. The method of claim 17, wherein transmitting the second message comprises beginning to transmit the second message after finishing transmission of the first message.

20. The method of claim 17, wherein the first message comprises an emergency message.

* * * * *